(12) United States Patent
Lee et al.

(10) Patent No.: US 12,480,847 B2
(45) Date of Patent: Nov. 25, 2025

(54) STAINING KIT AND METHOD OF IMMUNEPROFILING TO IDENTIFY CHARACTERIZED IMMUNE CELL SUBSETS OF DISEASE AND PREDICTING DISEASE USING THE SAME

(71) Applicant: FULLHOPE BIOMEDICAL CO., LTD., New Taipei (TW)

(72) Inventors: Jan-Mou Lee, New Taipei (TW);
Li-Jen Liao, New Taipei (TW);
Yen-Ling Chiu, New Taipei (TW);
Chih-Hao Fang, New Taipei (TW);
Kai-Yuan Chou, New Taipei (TW);
Pei-Hsien Liu, New Taipei (TW);
Cheng-Yun Lee, New Taipei (TW)

(73) Assignee: FULLHOPE BIOMEDICAL CO., LTD., New Taipei (TW)

( * ) Notice: Subject to any disclaimer, the term of this patent is extended or adjusted under 35 U.S.C. 154(b) by 631 days.

(21) Appl. No.: 17/938,188

(22) Filed: Oct. 5, 2022

(65) Prior Publication Data
US 2024/0118178 A1   Apr. 11, 2024

(51) Int. Cl.
*G01N 1/30* (2006.01)
*G01N 33/50* (2006.01)
*G01N 33/68* (2006.01)

(52) U.S. Cl.
CPC ............ *G01N 1/30* (2013.01); *G01N 33/5082* (2013.01); *G01N 33/6839* (2013.01)

(58) Field of Classification Search
CPC ...................................................... G01N 1/30
See application file for complete search history.

(56) References Cited

U.S. PATENT DOCUMENTS

2008/0280297 A1* 11/2008 Dalla-Favera ... G01N 33/57426
435/6.16

FOREIGN PATENT DOCUMENTS

| CN | 112424341 A | 2/2021 |
| JP | 2017-207519 A | 11/2017 |
| JP | 2018-505392 A | 2/2018 |
| JP | 2021-521466 A | 8/2021 |
| JP | 2022-512973 A | 2/2022 |
| WO | WO2022/002874 A1 | 1/2022 |

OTHER PUBLICATIONS

Chuang, W.-Y., et al., "Successful Identification of Nasopharyngeal Carcinoma in Nasopharyngeal Biopsies Using Deep Learning," Cancers 2020;12:11 pp.

Gong, L., et al., "Comprehensive single-cell sequencing reveals the stromal dynamics and tumor-specific characteristics in the microenvironment of nasopharyngeal carcinoma," Nature Communications 2021;12:1540;18 pp.

Mathias Streitz, et al., "Standardization of whole blood immune phenotype monitoring for clinical trials: panels and methods from the ONE study", Transplantation Research, Biomed Central Ltd, London, UK, 2013; 2(1):17 (Oct. 25, 2013).

Lily M Park, et al., "OMIP-069: Forty-Color Full Spectrum Flow Cytometry Panel for Deep Immunophenotyping of Major Cell Subsets in Human Peripheral Blood", Cytometry A, Wiley-Liss, Hoboken, USA, 2020; 97(10):1044-1051 (Aug. 31, 2020).

Van Dongen J J M, et al., "EuroFlow antibody panels for standardized n-dimensional flow cytometric immunophenotyping of normal, reactive and malignant leukocytes", Leukemia, 2012; 26(9):1908-1975 (Sep. 1, 2012).

Ruhle, Paul, et al., "Development of a Modular Assay for Detailed Immunophenotyping of Peripheral Human Whole Blood Samples by Multicolor Flow Cytometry", International Journal of Molecular Sciences, 2016; 17(8):1316 (Aug. 11, 2016).

Antunes, Ana Rita Pombo, et al., "Single-cell profiling of myeloid cells in glioblastoma across species and disease stage reveals macrophage competition and specialization", Nature Neuroscience, 2021; 24(4):595-610 (Apr. 2021).

K-M Lau, et al., Increase in circulating Foxp3+CD4+CD25high regulatory T cells in nasopharyngeal carcinoma patients, British Journal of Cancer; 2007; 96(4):617-622 (Jan. 30, 2007).

Jiang Li, et al., "Immunophenotyping at the Time of Diagnosis Distinguishes Two Groups of Nasopharyngeal Carcinoma Patients: Implications for Adoptive Immunotherapy", International Journal of Biological Sciences, 2011; 7(5):607-617 (Jan. 1, 2011).

A. Oras, A study of 51 subtypes of peripheral blood immune cells in newly diagnosed young type 1 diabetes patients, Clin Exp Immunol., Oct. 2019, 198(1), pp. 57-70.

Jing Zhu, Circulating lymphocyte subsets are prognostic factors in patients with nasopharyngeal carcinoma, BMC Cancer, Jun. 29, 2022, 22(1)716, pp. 1-1.

Lei Chen, Recognition of Immune Cell Markers of COVID-19 Severity with Machine Learning Methods, BioMed Research International, Apr. 28, 2022, 2022, 1-12.

* cited by examiner

*Primary Examiner* — Albert M Navarro
(74) *Attorney, Agent, or Firm* — Cermak & McGowan LLP; Shelly Guest Cermak

(57) ABSTRACT

A staining kit is provided, including a first pattern including antibodies against T cell, B cell, NK cell, monocyte, regulatory cell, CD8, CD45, and CTLA4; a second pattern including antibodies against T cell, B cell, NK cell, monocyte, regulatory cell, dendritic cell, and CD45; a third pattern including antibodies against T cell, B cell, NK cell, monocyte, CD8, CD45, CD45RA, CD62L, CD197, CX3CR1 and $TCR_{\alpha\beta}$; and a fourth pattern including antibodies against B cell, CD23, CD38, CD40, CD45 and IgM, wherein the antibodies of each pattern are labeled with fluorescent dyes. A method of identifying characterized immune cell subsets of a disease and a method of predicting the likelihood of NPC in a subject in the need thereof using the staining kit are also provided.

7 Claims, 28 Drawing Sheets

STAINING KIT AND METHOD OF IMMUNEPROFILING TO IDENTIFY CHARACTERIZED IMMUNE CELL SUBSETS OF DISEASE AND PREDICTING DISEASE USING THE SAME

FIELD OF INVENTION

The present disclosure relates to a staining kit and uses thereof, and in particular to a staining kit, and a method of identifying characterized immune cell subsets of a disease and a method of predicting the likelihood of nasopharyngeal carcinoma (NPC) in a subject in the need thereof using the same.

BACKGROUND OF THE INVENTION

According to the global statistics about cancer incidence and death, nasopharyngeal carcinoma (NPC) ranks as the $24^{th}$ common and lethal cancer in 2020, which includes 133 thousand new-diagnosed subjects (0.7% of new-diagnosed subjects) and 80 thousand new cancer death (0.8% of new cancer death). Although NPC is not a highly lethal cancer, early diagnosis of NPC is still a challenge. The diagnostic algorithm of NPC is initiated from symptoms of the neck, nose, or pharynx and confirmed with nasopharynx imaging (such as magnetic resonance imaging, positronic emission tomography, or computed tomography) or nasopharynx biopsy. However, patients with NPCs are frequently diagnosed with advanced stages (stage III or IV) due to highly variable symptoms and the blind spot of nasopharynx imaging in pharynx recess. Furthermore, advanced NPC has distant metastasis to the brainstem, bone marrow, liver, and lung, and which sites have the toxic concern about chemotherapy and radiotherapy even though NPC cells are highly susceptible to radiotherapy. Accordingly, the prognosis of advanced NPC is much worse than the early stage of NPC.

Based on the practical guideline from the European Society of Medical Oncology, the recommended diagnostic tool of NPC is nasopharynx imaging coupled with biopsy after onset[2]. However, the high cost of full compliance with surveillance projects in the guideline leads to more than two-thirds of recurrent NPC subjects not being diagnosed in the clinical. Therefore, oncologists try to use deep learning, convolutional neural network, and narrow-band imaging to improve the sensitivity of nasopharynx imaging[1]. In addition to improvement in imaging techniques, the presence of anti-Epstein-Barr virus (EBV) antibody or EBV cDNA are closely related to the risk of NPC but not human papillomavirus (HPV). However, approximately 95% human population are EBV infected, but less than 0.01% of the infected humans develop NPC. In addition, EBV infection also links to the incidence of Burkitt's lymphoma, Hodgkin's lymphoma, and gastric carcinoma. Accordingly, neither anti-EBV antibody nor EBV cDNA has durable accuracy for supporting NPC diagnosis or being a prior indicator of NPC. Thus, the development of supported tools for NPC diagnosis is critical.

Crosstalk between tumors and immune cells is a hot topic that illustrates how tumor cells escaped from immune surveillance. Hence, the comparison of the immune profile between cancer patients and healthy controls (HCs) in composition, metabolism, and transcriptome are widely studied. For patients with breast cancer, colorectal cancer, and advanced hepatocellular carcinoma, their immune profiles are distinct from HCs and are promising as a precedent indicator in cancer diagnosis. For NPC, the characteristic of immune profile between NPCs and HCs is still unclear, except for a higher proportion of EBV antigen-specific CD8$^+$ regulatory T cells and a lower proportion of CD4$^+$ T cells, IL-17 producing CD8+ T cells, and early phase B lymphocytes in the EBV-positive NPCs than HCs. Also, the recent studies about the alteration of immune profiling in NPCs are focused on the transcriptomic change using single-cell sequencing or comparative immune profiling between peripheral blood mononuclear cells (PBMCs) and tumor-infiltrating lymphocytes[2].

SUMMARY OF THE INVENTION

In view of the description above, the present invention aims to comprehensively compare immune cell subsets between patients having a disease, such as nasopharyngeal carcinoma (NPC), and healthy controls to identify the characterized immune cell subsets of the disease. Furthermore, the present invention uses the characterized immune cell subsets to predict the likelihood of a disease, such as NPC, in a subject in need thereof.

In one aspect, the present disclosure provides a staining kit. The staining kit includes a first pattern including antibodies against T cell, B cell, NK cell, monocyte, regulatory cell, CD8, CD45, and CTLA4; a second pattern comprising antibodies against T cell, B cell, NK cell, monocyte, regulatory cell, dendritic cell, and CD45; a third pattern comprising antibodies against T cell, B cell, NK cell, monocyte, CD8, CD45, CD45RA, CD62L, CD197, CX3CR1 and TCR$_{\alpha\beta}$; and a fourth pattern comprising antibodies against B cell, CD23, CD38, CD40, CD45 and IgM, wherein the antibodies of each pattern are labeled with fluorescent dyes.

Preferably, the T cell comprises CD3, CD4, CD25, CD45RO, CCR7 or any combination thereof; the B cell comprises CD10, CD19, CD21, CD127, IgG or any combination thereof; the NK cell comprises CD56; the monocyte comprises CD14; the regulatory cell comprises PD-1, PD-L1, FoxP3 or any combination thereof; and the dendritic cell comprises CD11c, HLA-DR or combination thereof.

In another aspect, the present disclosure provides a method of identifying characterized immune cell subsets of a disease, including steps of:
  (a) obtaining peripheral blood mononuclear cells (PBMCs) and/or white blood cells (WBCs) from a plurality of healthy controls and a plurality of patients having the disease, respectively,
  (b) staining the PBMCs and/or the WBCs of the healthy controls and the patients, respectively, by using the staining kit, wherein the staining kit includes a first pattern including antibodies against T cell, B cell, NK cell, monocyte, regulatory cell, CD8, CD45, and CTLA4; a second pattern comprising antibodies against T cell, B cell, NK cell, monocyte, regulatory cell, dendritic cell, and CD45; a third pattern comprising antibodies against T cell, B cell, NK cell, monocyte, CD8, CD45, CD45RA, CD62L, CD197, CX3CR1 and TCR$_{\alpha\beta}$; and a fourth pattern comprising antibodies against B cell, CD23, CD38, CD40, CD45 and IgM, wherein the antibodies of each pattern are labeled with fluorescent dyes;
  (c) performing data acquisition of fluorescent intensity of each antibody bound to the PBMCs and/or the WBCs of the healthy controls and the patients, respectively, by using flow cytometry;
  (d) identifying immune cell subsets in the PBMCs and/or the WBCs of the healthy controls and the patients, respectively, by using a pedigree method to obtain a dataset including data related to types of the immune cell subsets and proportions thereof; and (e) evaluating the dataset by using a machine learning software to obtain the types of the immune cell subsets of the patients distinguishable from those of the healthy controls as the characterized immune cell subsets of the disease.

In further another aspect, the step (e) further includes performing the following steps by the machine learning software:

(i) performing data preprocessing of the dataset;

(ii) performing a feature selection from the preprocessed data by using a Boruta algorithm to obtain predetermined immune cell subsets of the disease as selected features; and (iii) applying data of the selected features to train machine learning models by at least one of a random forest (RF) algorithm, a logistic regression (LR) algorithm and a support vector machines (SVM) algorithm.

A method of predicting the likelihood of nasopharyngeal carcinoma (NPC) in a subject in need thereof, including steps of:

(a) staining peripheral blood mononuclear cells (PBMCs) from the subject by using the staining kit described above;

(b) performing data acquisition of fluorescent intensity of each antibody bound to characterized immune cell subsets of NPC by using flow cytometry to obtain a dataset including data related to types of the characterized immune cell subsets and proportions thereof; and (c) evaluating the dataset by using a machine learning software to predict whether the subject has nasopharyngeal carcinoma, wherein the characterized immune cell subsets of NPC are elected from the group consisting of memory B cells, monocytes, T cells, naïve CD4 $\alpha\beta$ T cells, PD-1$^+$CD4 T cells, PD-L1$^+$ CD4 T cells, PD-1$^+$PD-L1$^+$ monocytes, CD4 NKTreg cells, MHC II$^+$ CD4 T cells and MHC II$^+$ CD4 NKT cells.

Preferably, the step (c) further includes the following steps performed by the machine learning software:

(i) applying the hold-out set with the characterized immune cell subsets to test trained machine learning models;

(ii) predicting the subject as nasopharyngeal carcinoma if a value of the predicted probability obtained from a RF algorithm or a LR algorithm is larger than a first threshold value, or a value of a decision function obtained from a SVM algorithm is larger than a second threshold value.

Therefore, the present disclosure at least provides the following advantages:

1. The staining kit of the claimed invention can be applied to easily and rapidly identify characterized immune cell subsets of diseases.
2. The staining kit of the claimed invention can be applied to efficiently predict the likelihood of diseases, such as NPC, in subjects in need thereof.
3. The present invention provides a novel disease diagnosis platform by combining a staining kit with a flow cytometry and a machine learning software, such as Python program, with RF, LR and/or SVM algorithm analyses so as to construct a potent tool for supporting disease diagnosis.
4. The performances of the methods of predicting/diagnosing diseases of the claimed invention can reach to high AUC (e.g., up to 0.98), sensitivity (e.g., up to 100%) and specificity (e.g., up to 90%) with RF, LR and/or SVM algorithm analyses.

BRIEF DESCRIPTION OF THE DRAWINGS

FIGS. 2a-2k illustrate the filtrating processes to obtain immune cell subsets using a pedigree method, wherein FIGS. 2a-2c illustrate the pattern PT-67 pedigree; FIG. 2d illustrates the pattern PT-64 pedigree; FIG. 2e illustrates the pattern PT-65 pedigree; FIG. 2f illustrates the pattern PT-66 pedigree; FIG. 2g illustrates the pattern PT-68 pedigree; FIG. 2h illustrates the pattern PT-87 pedigree; FIG. 2i illustrates the pattern PT-83 pedigree; FIG. 2j illustrates the pattern PT-85 pedigree; and FIG. 2k illustrates the pattern PT-86 pedigree.

DETAILED DESCRIPTION

Definitions

Figure 1:
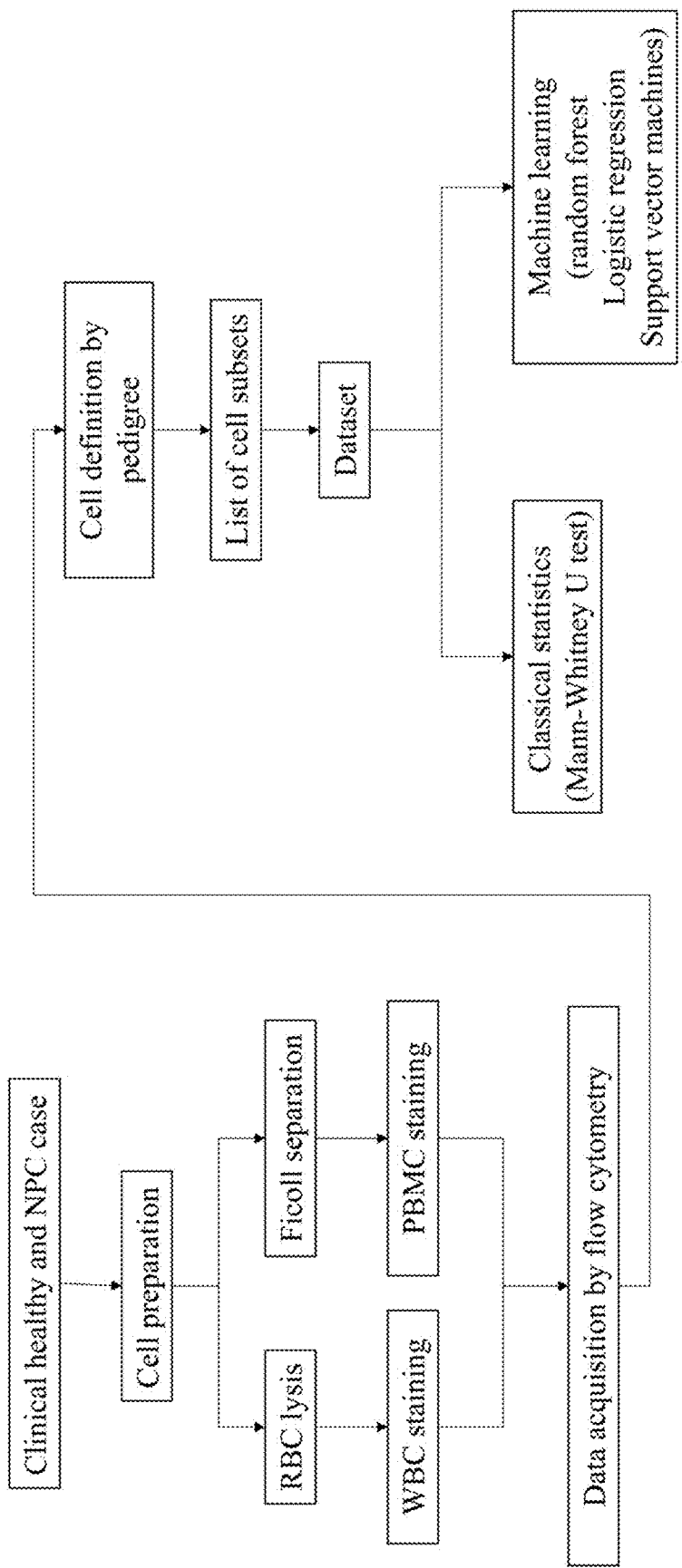
FIG. 1 illustrates a flow chart of identifying the characterized immune cell subsets of NPC.
Figure 2A:
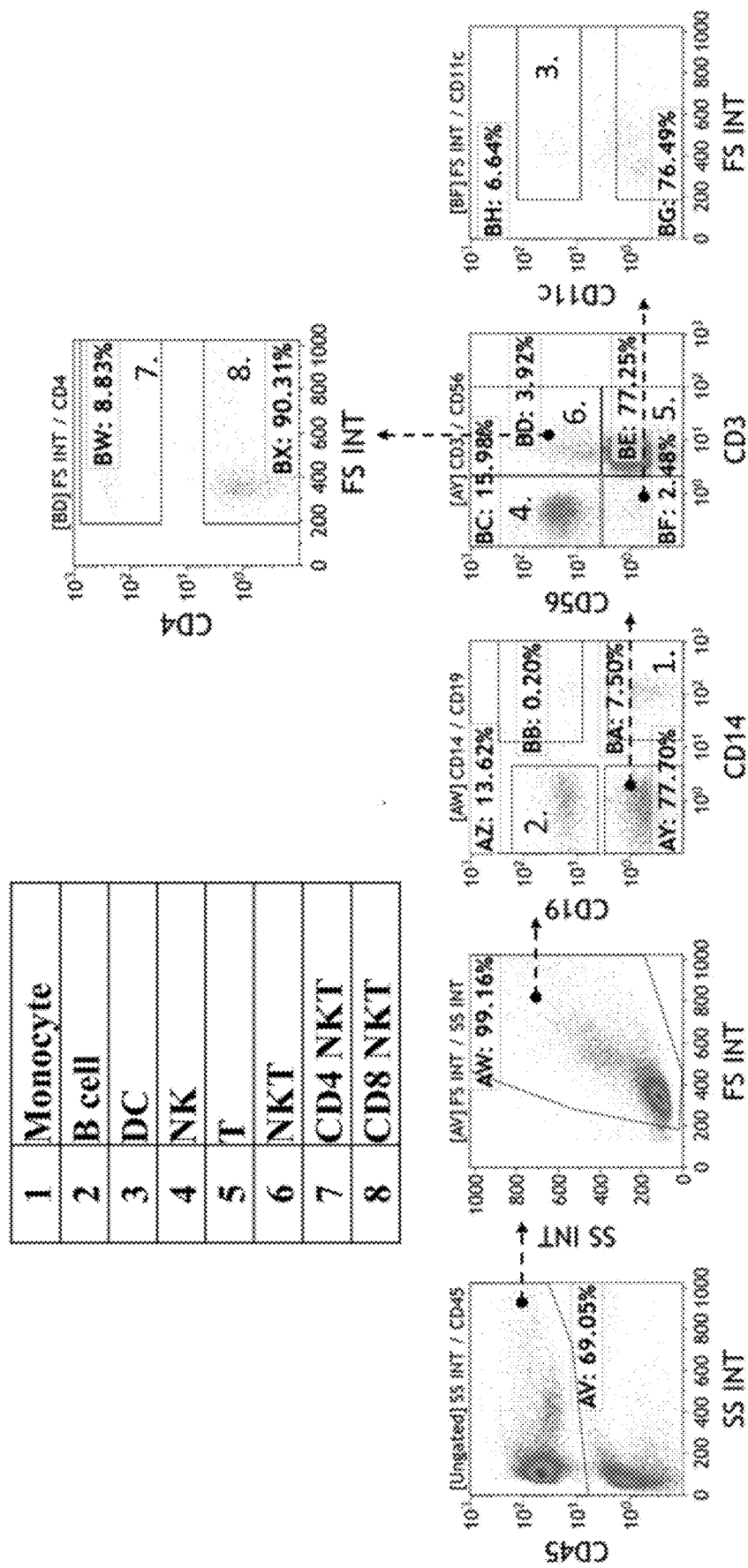
Figure 2B:
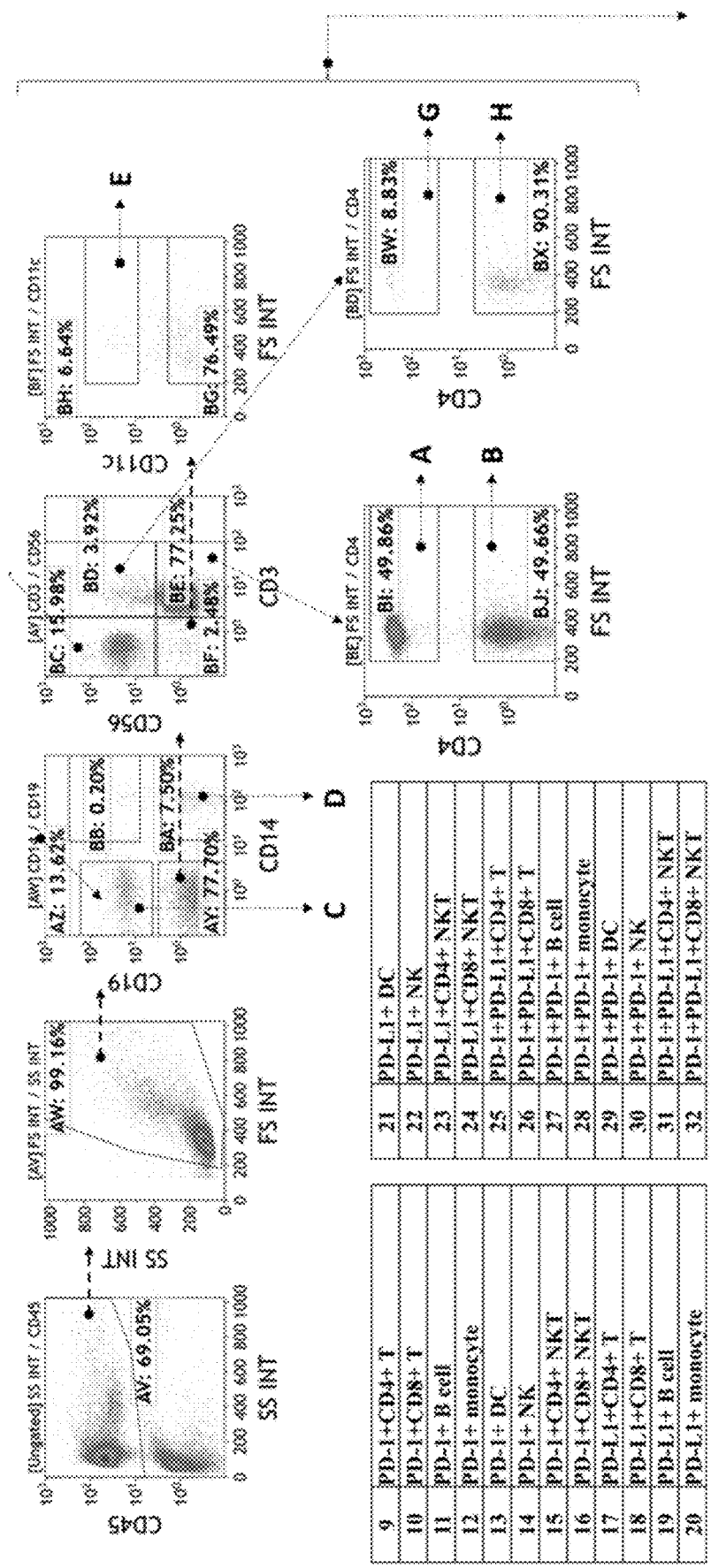
Figure 2B:
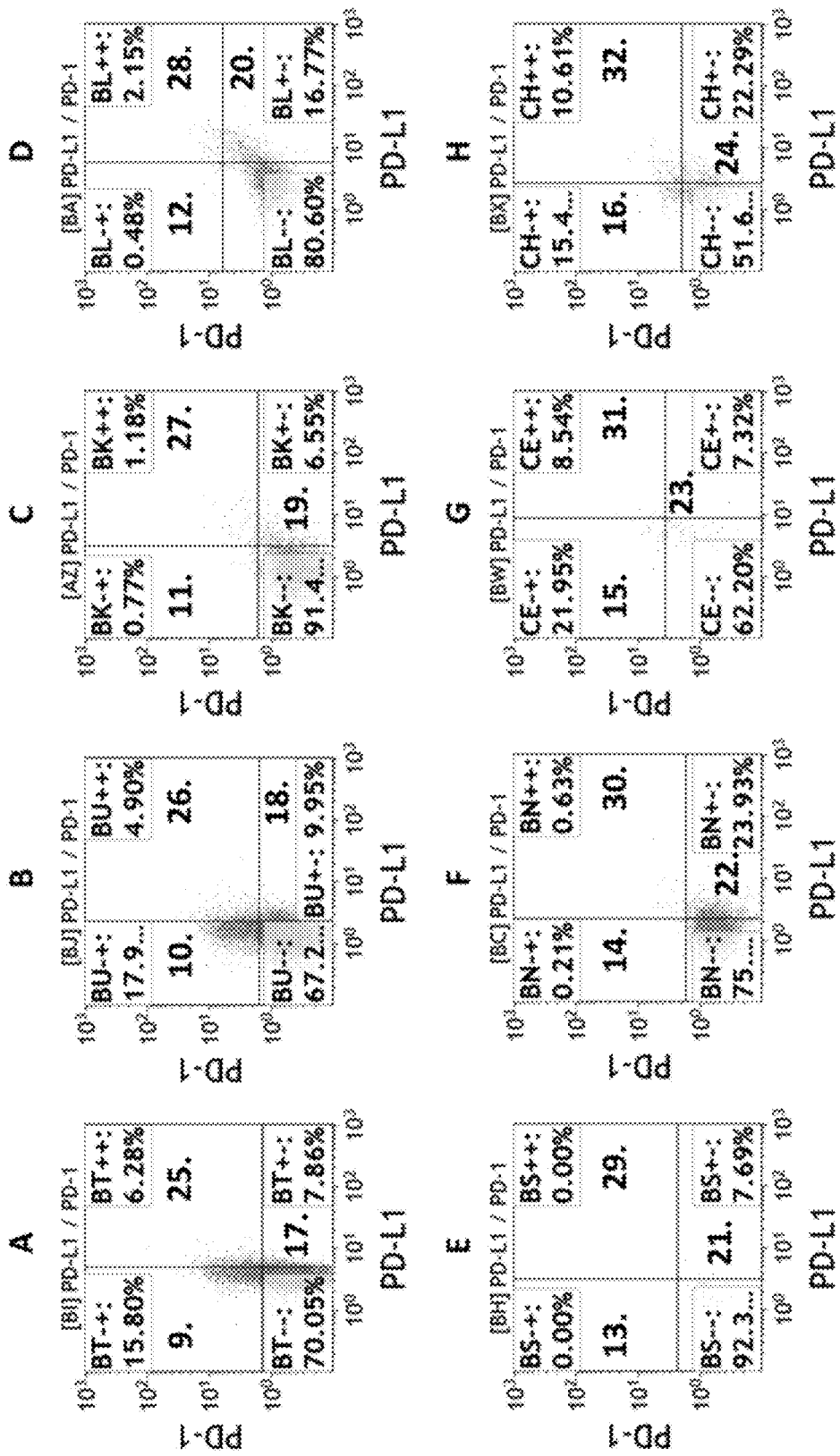
Figure 2C:
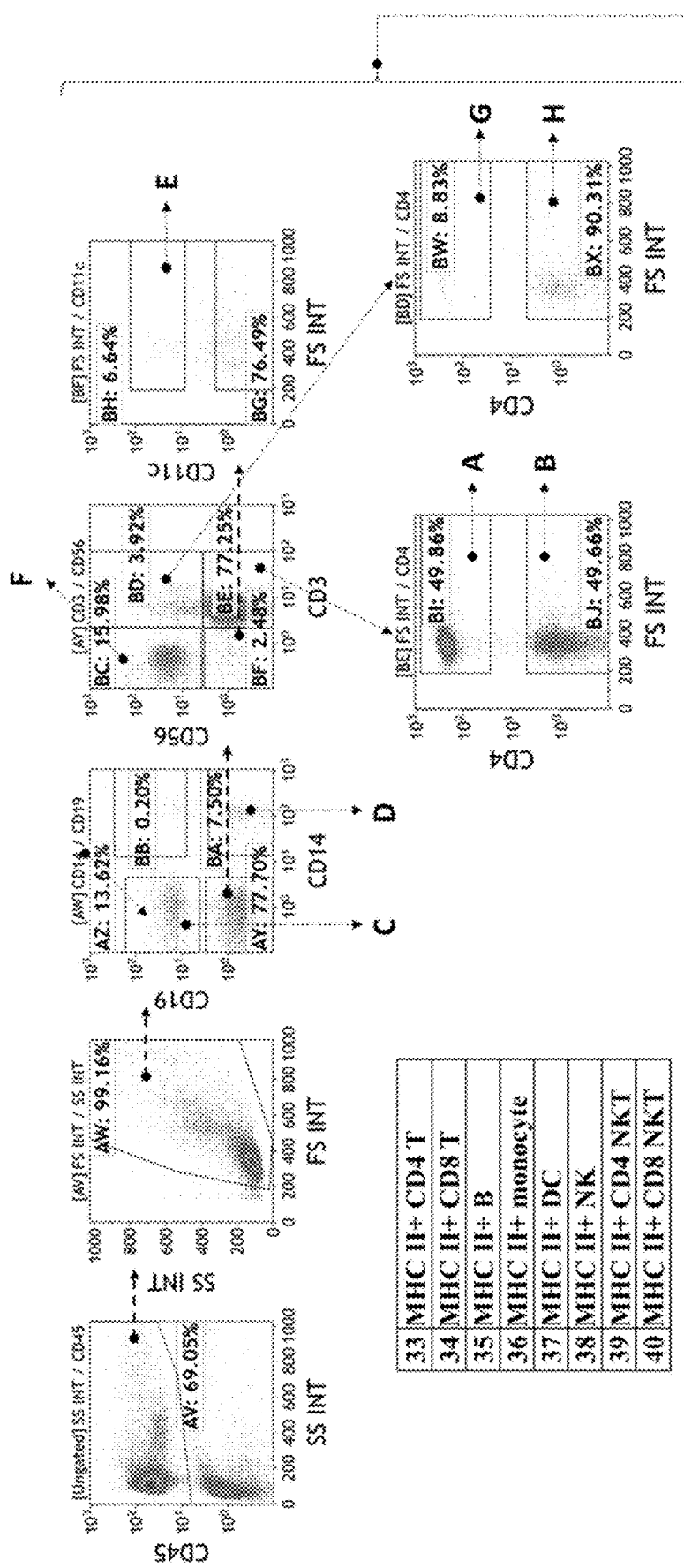
Figure 2C:
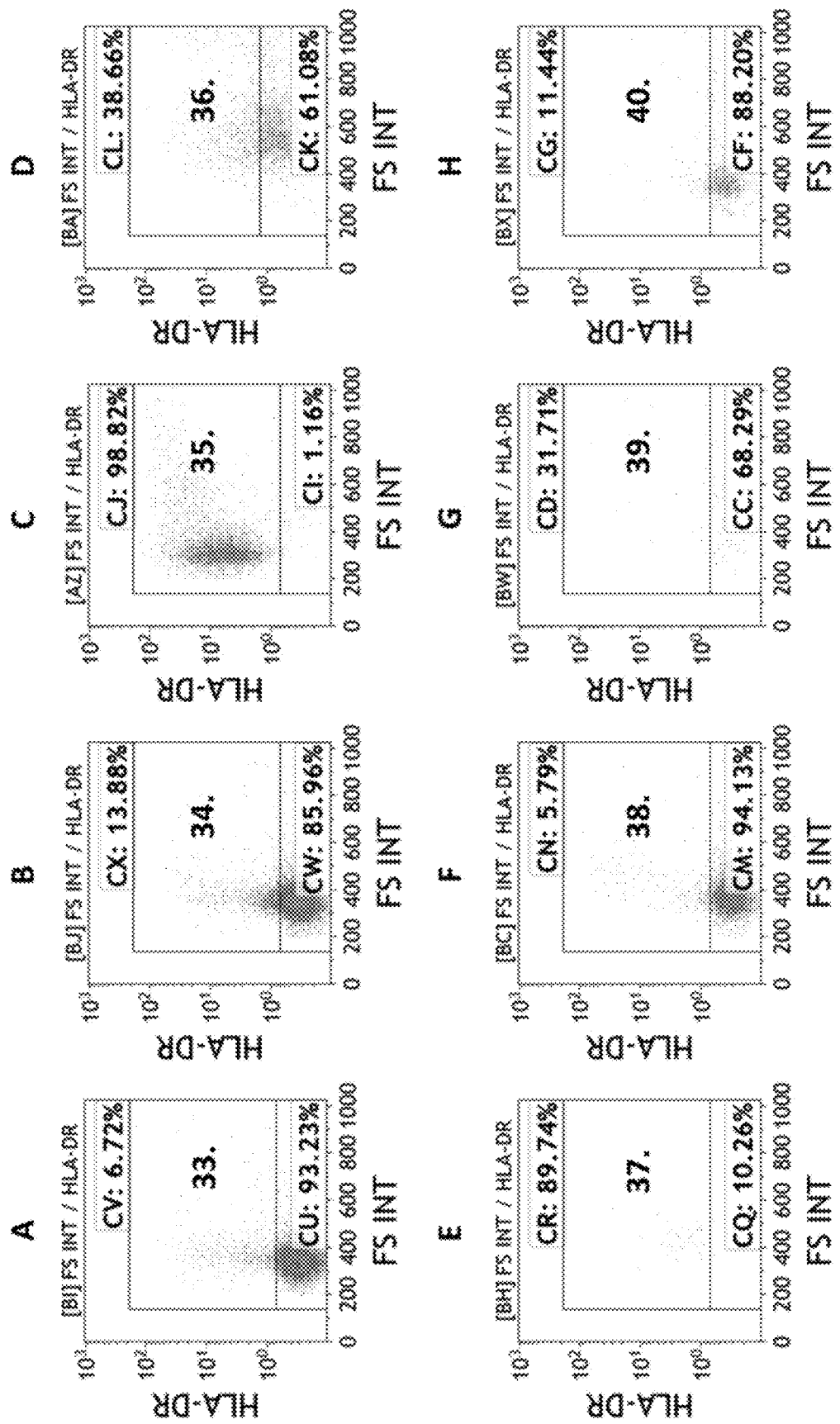
Figure 2D:
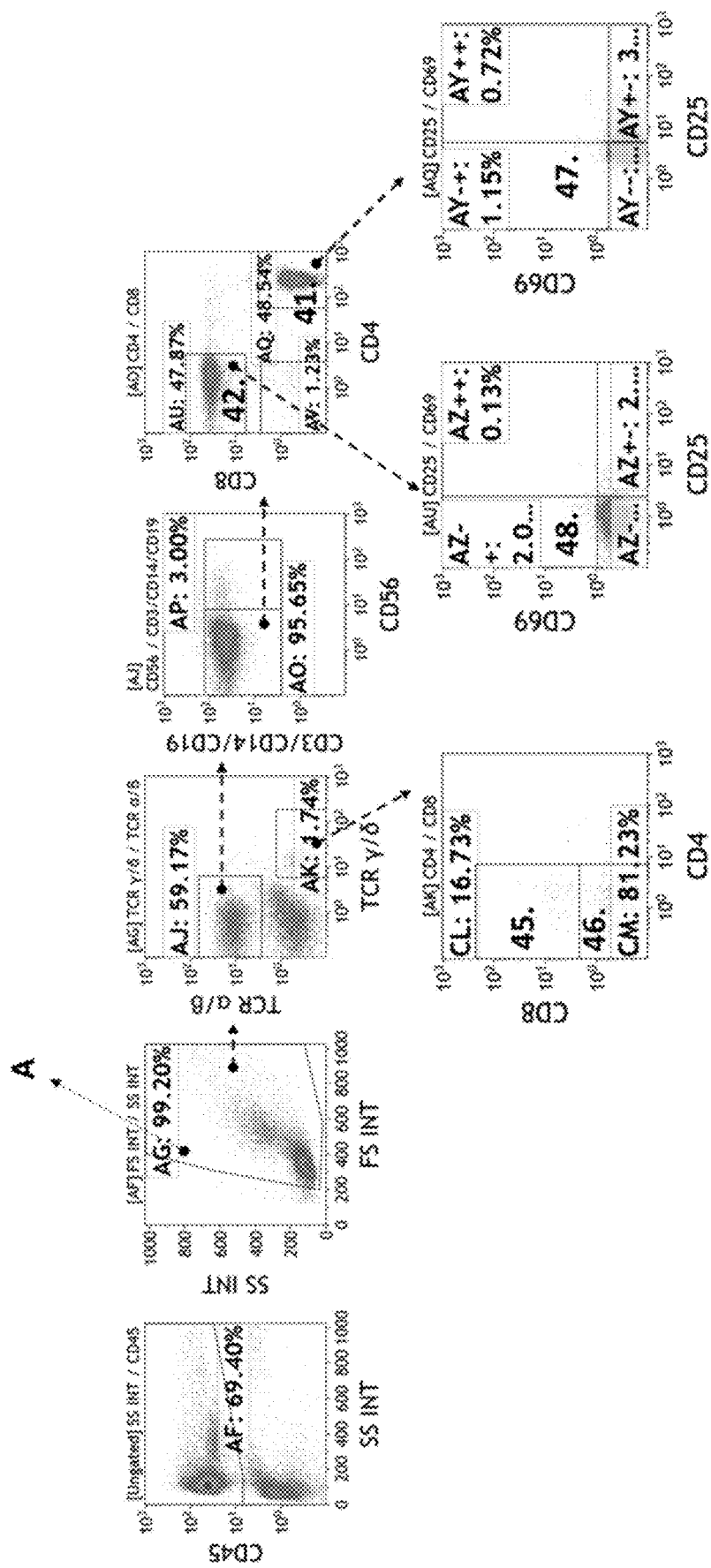
Figure 2D:
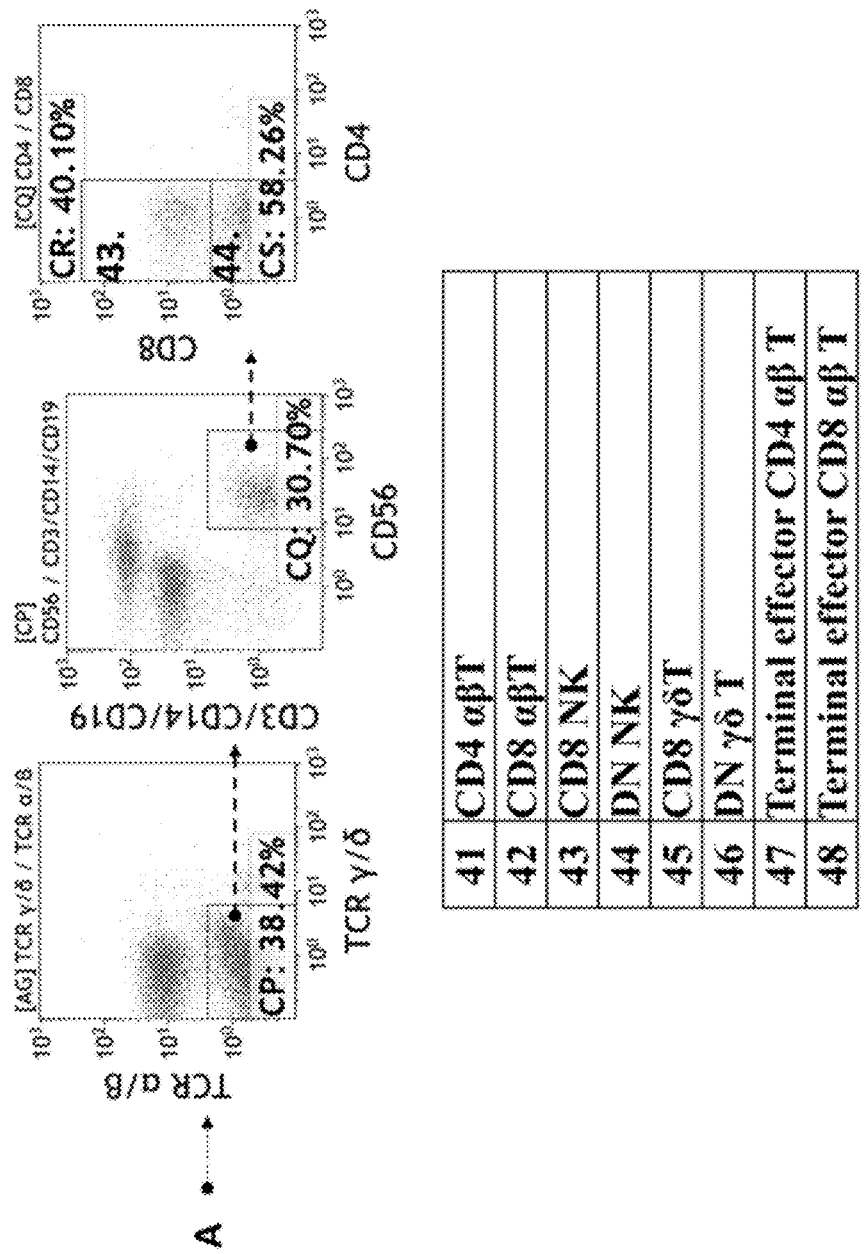
Figure 2E:
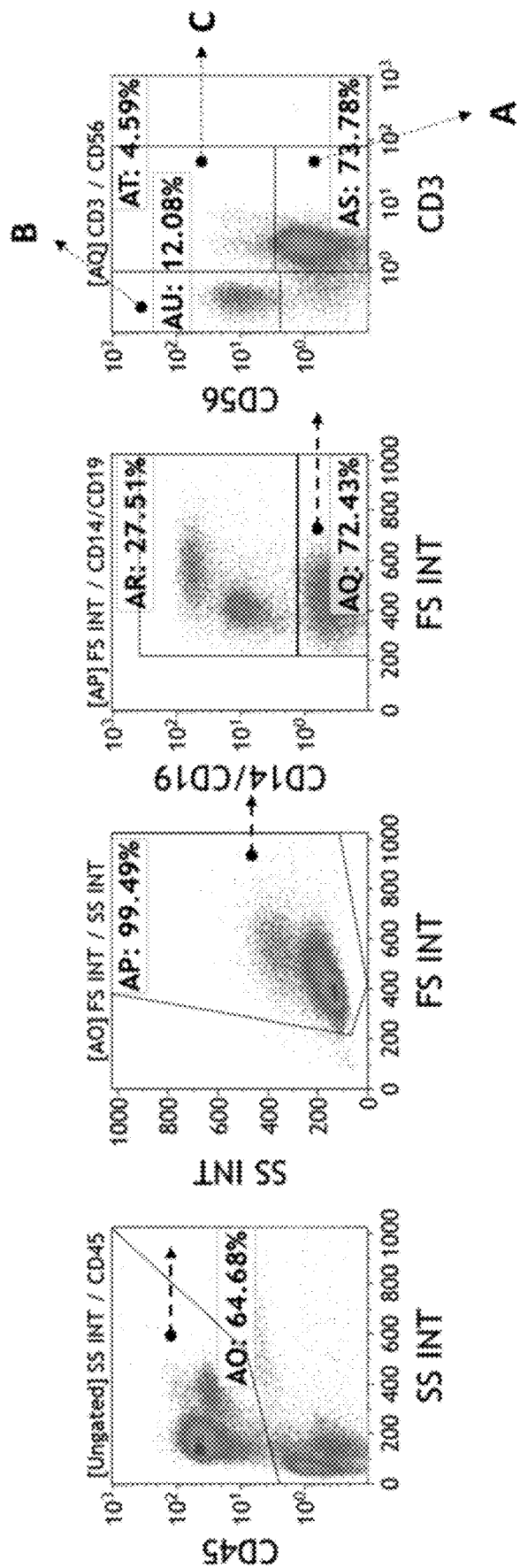
Figure 2E:
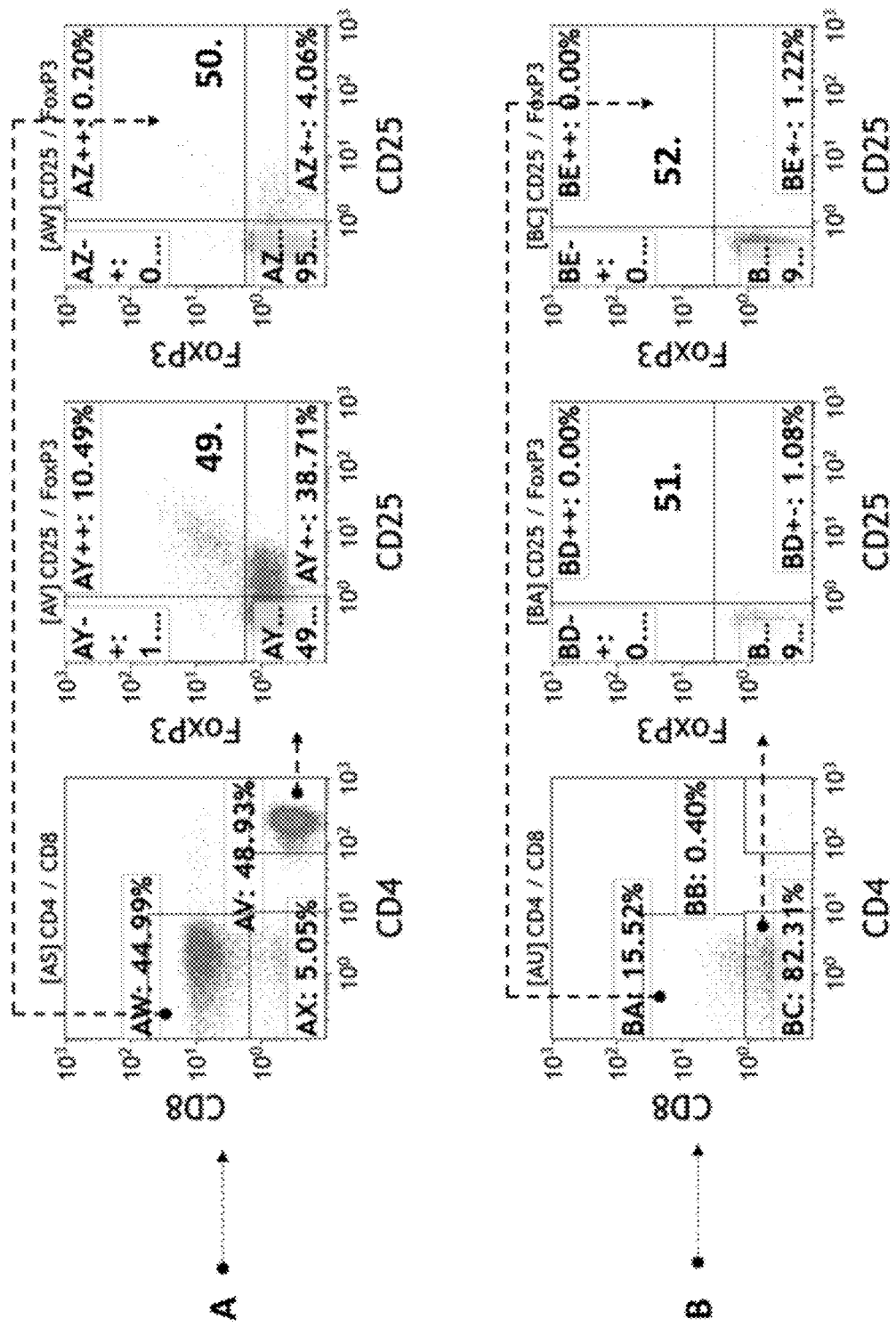
Figure 2E:
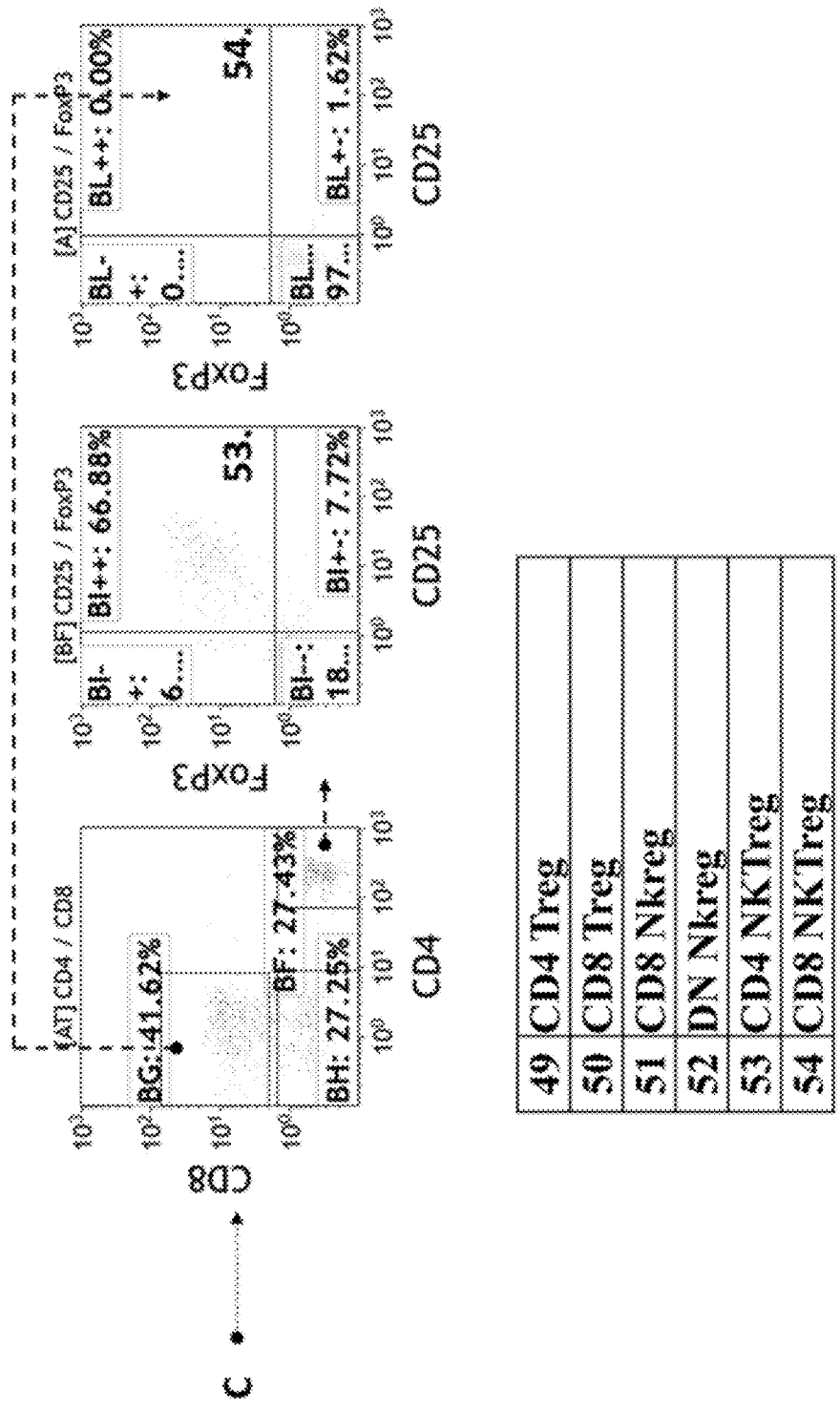
Figure 2F:
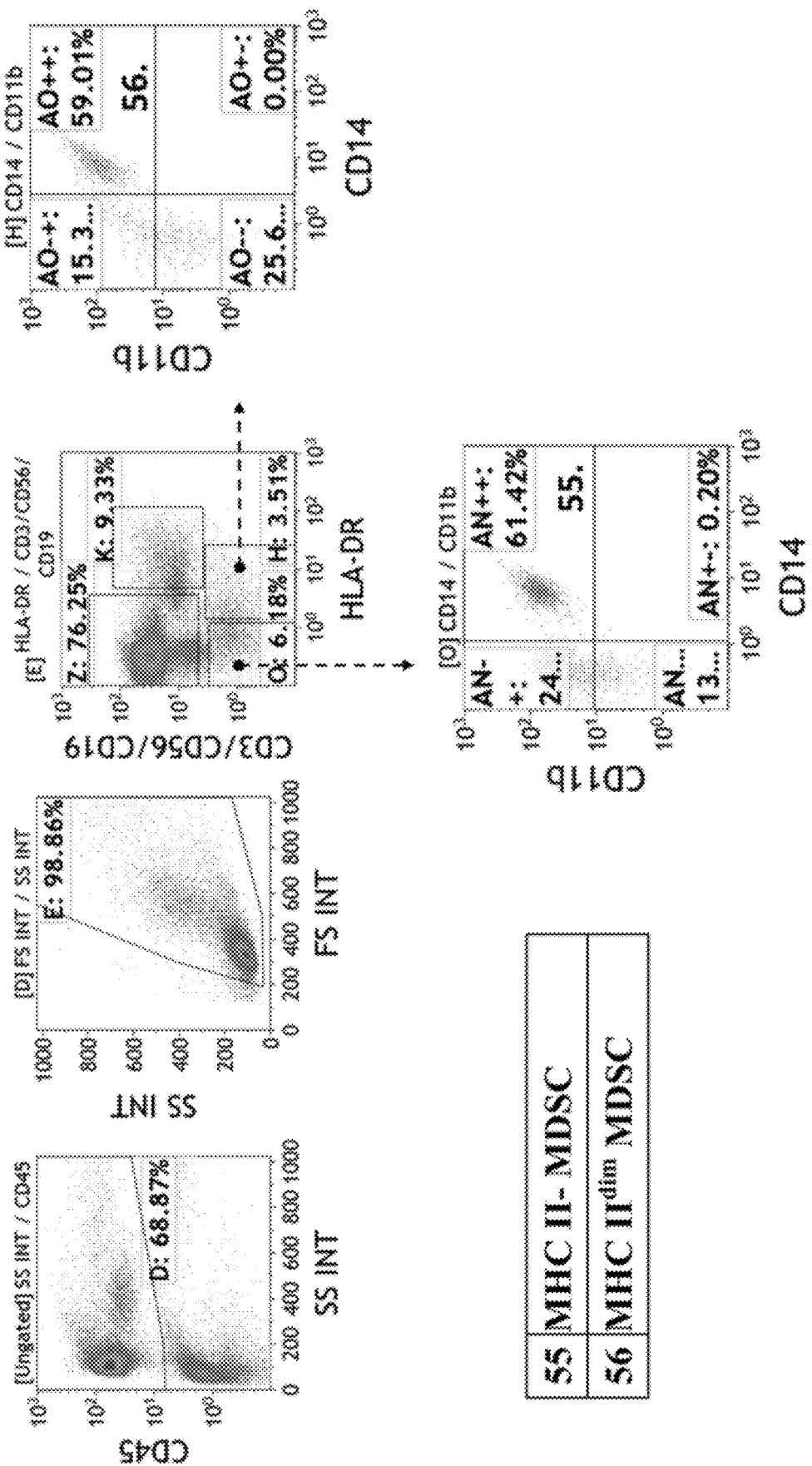
Figure 2G:
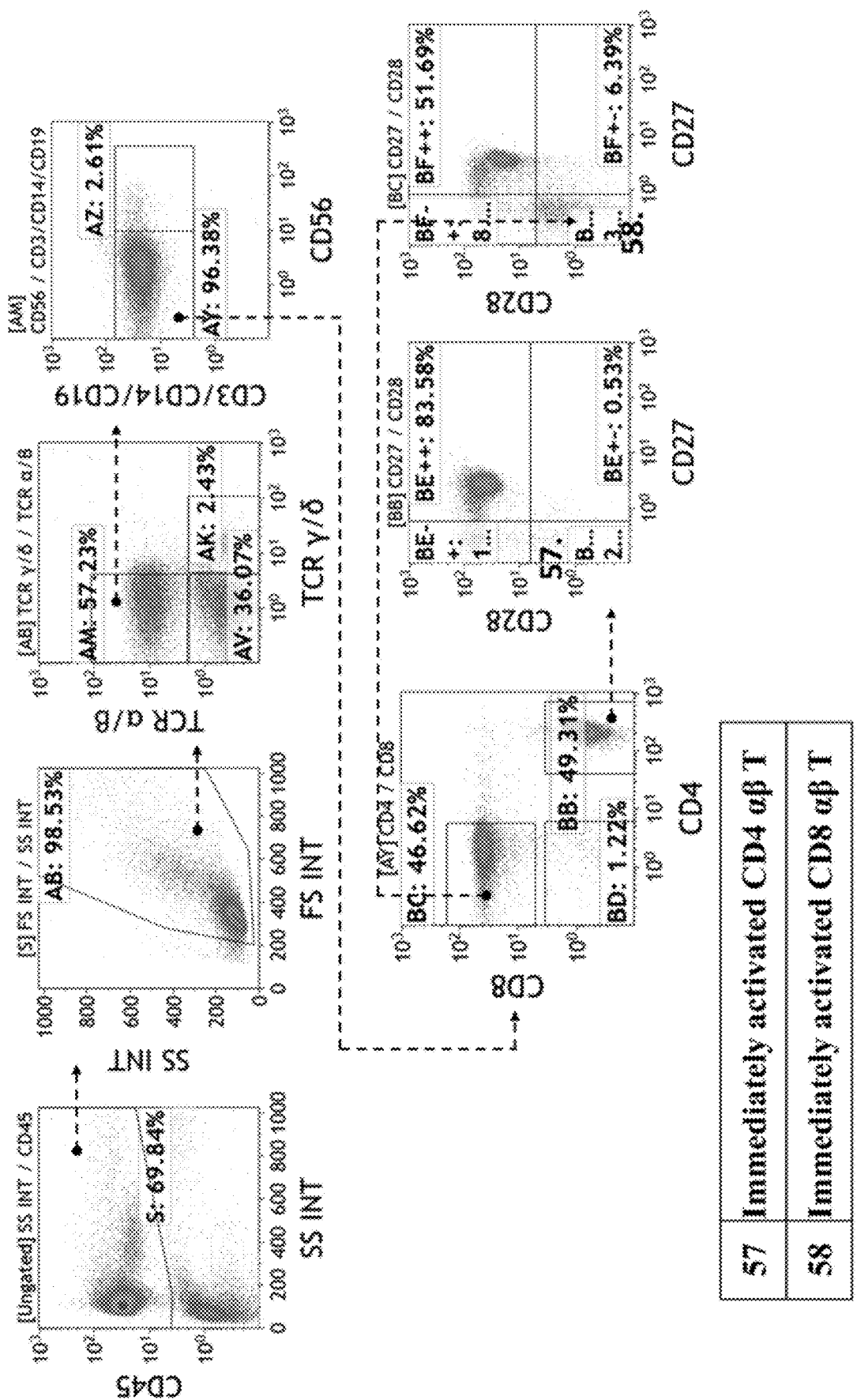
Figure 2H:
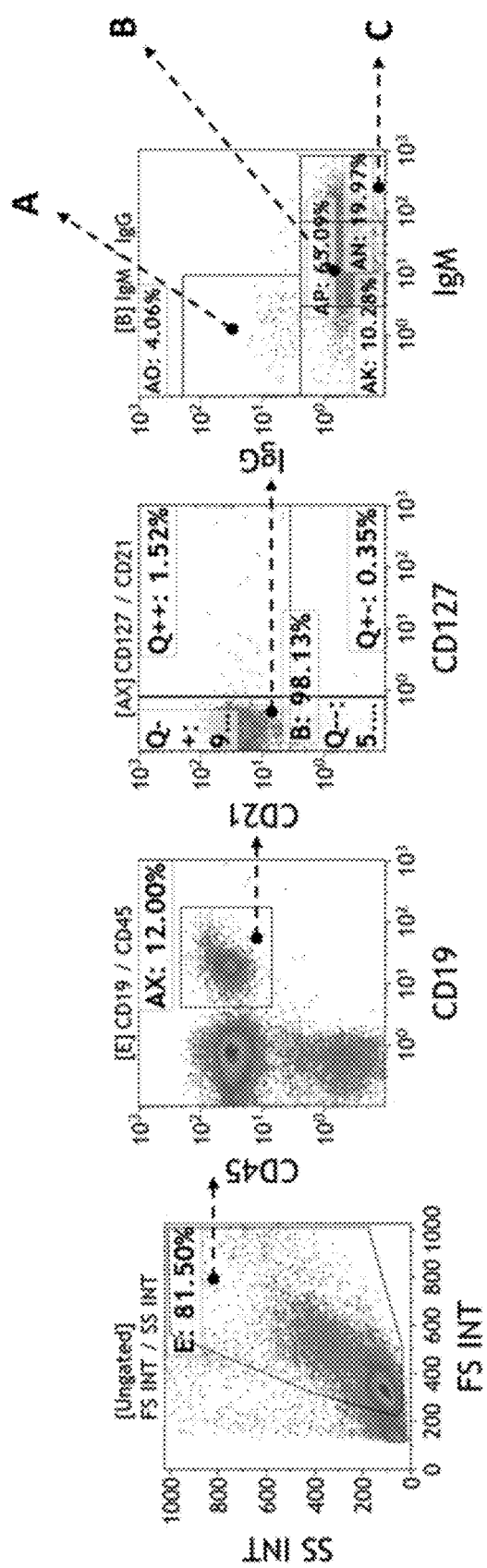
Figure 2H:
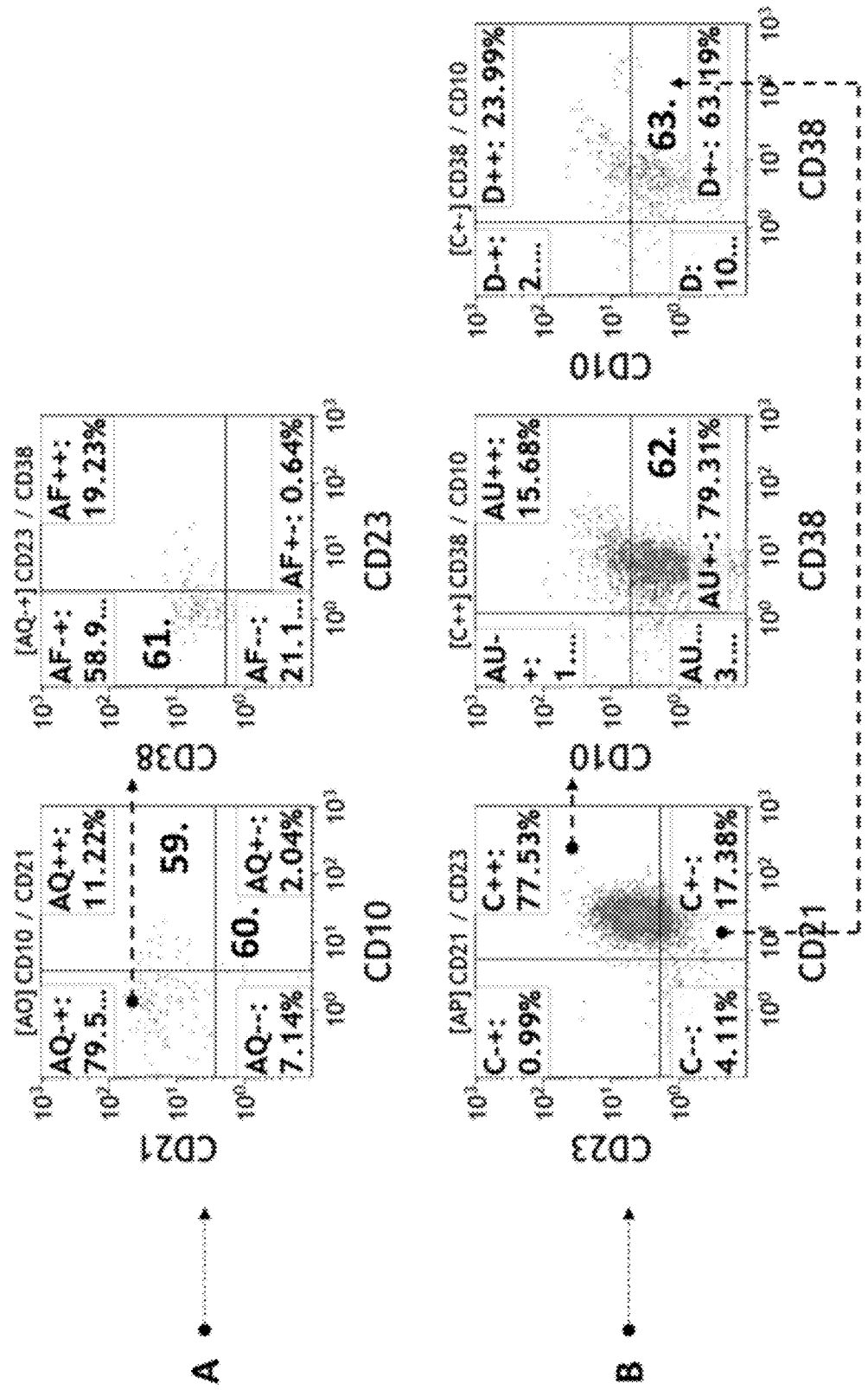
Figure 2H:
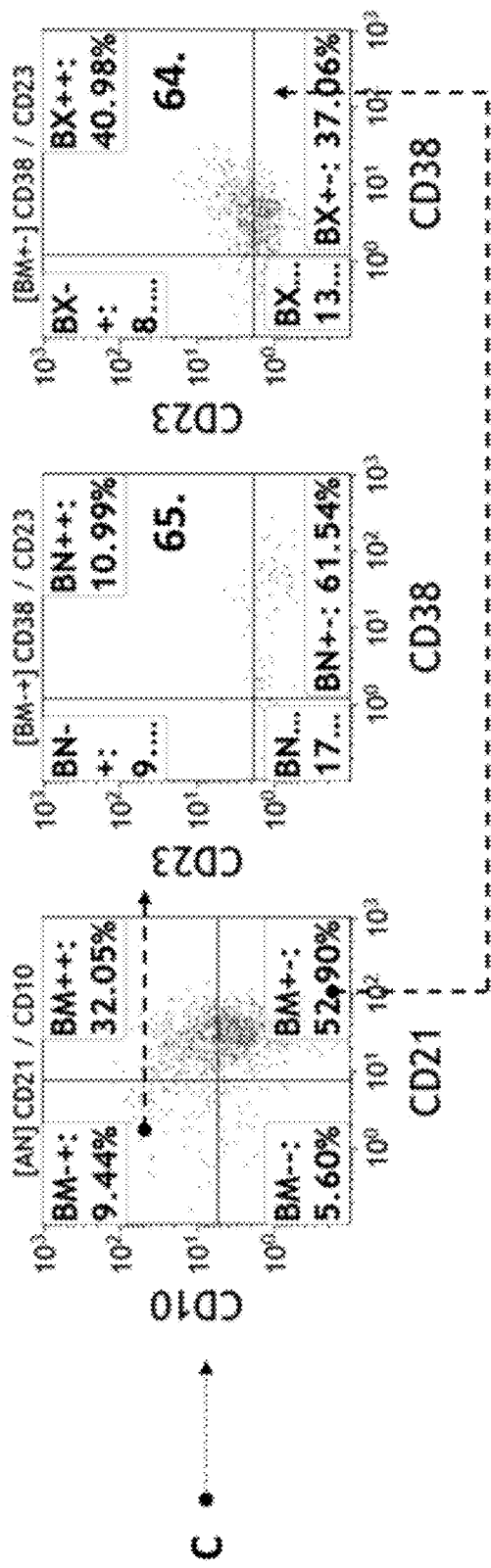
Figure 2I:
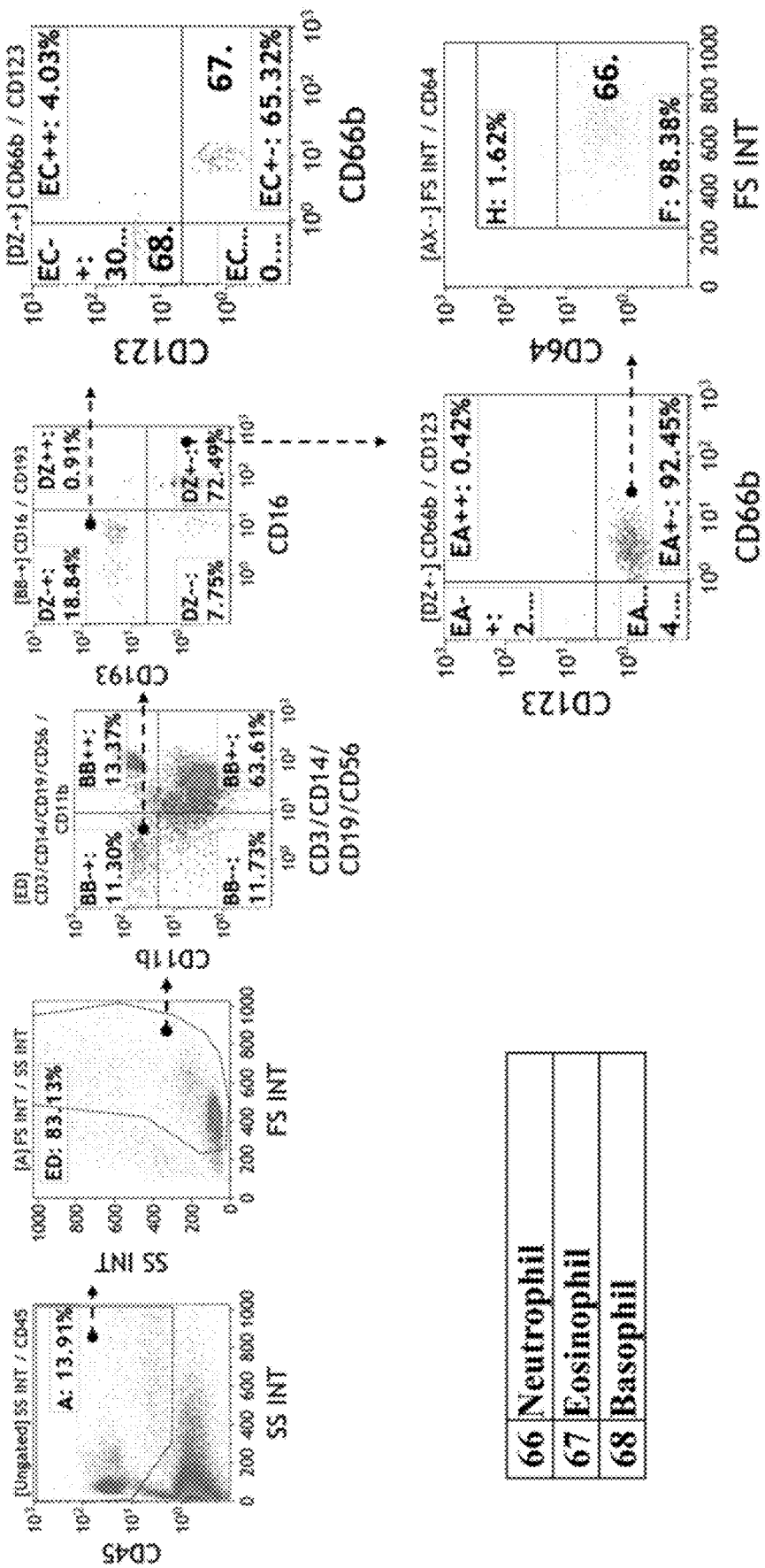
Figure 2J:
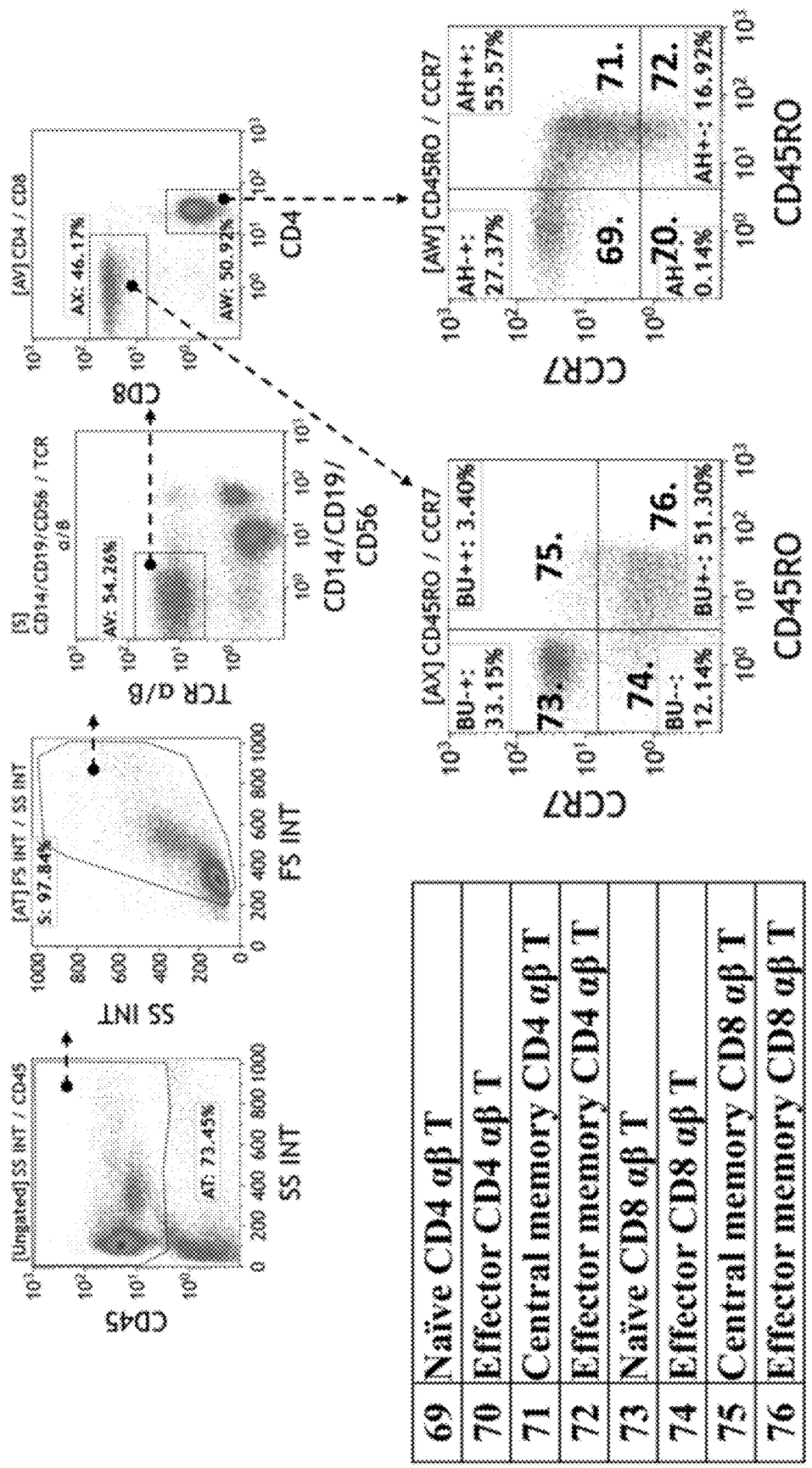
Figure 2K:
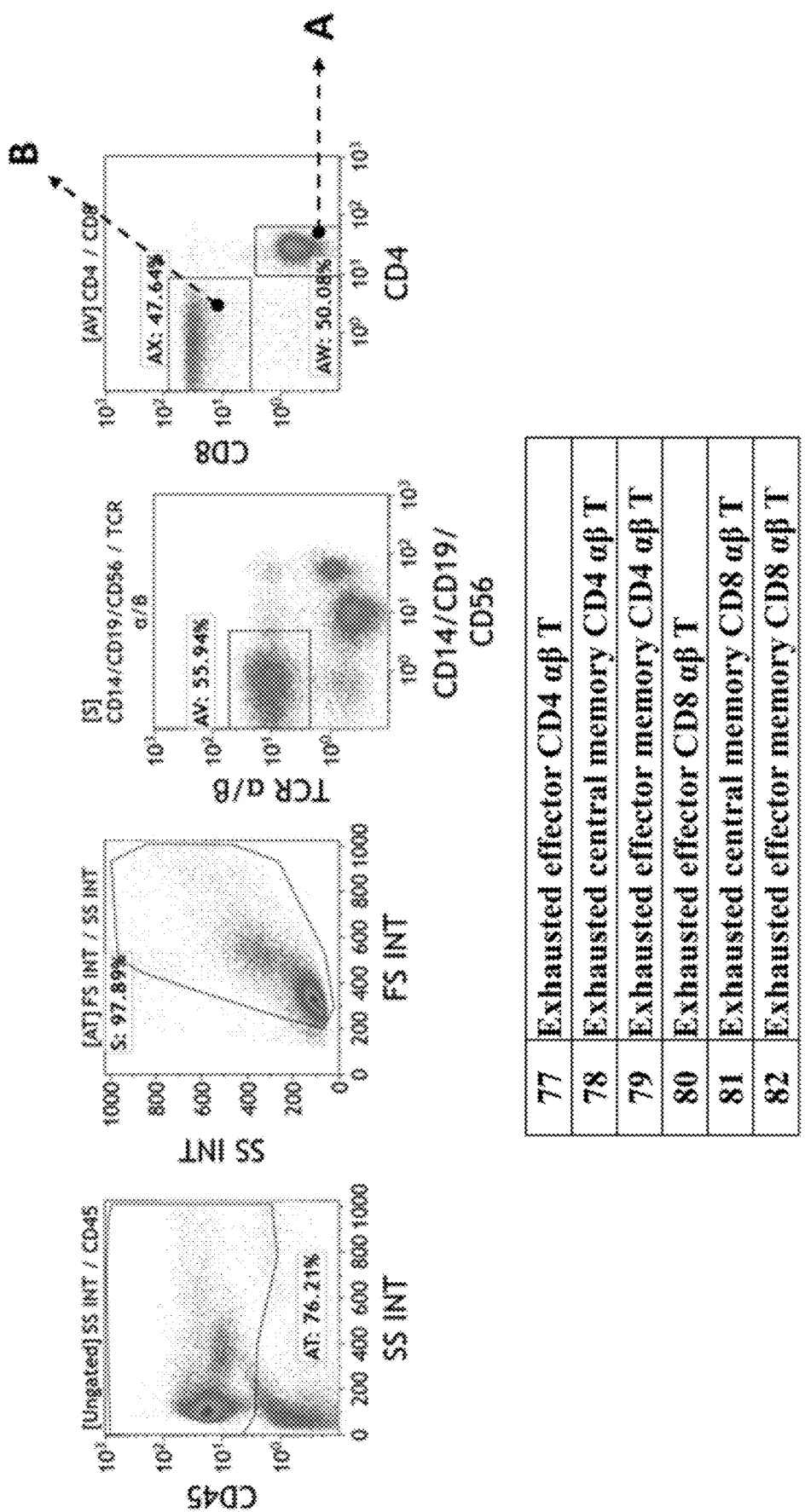
Figure 2K:
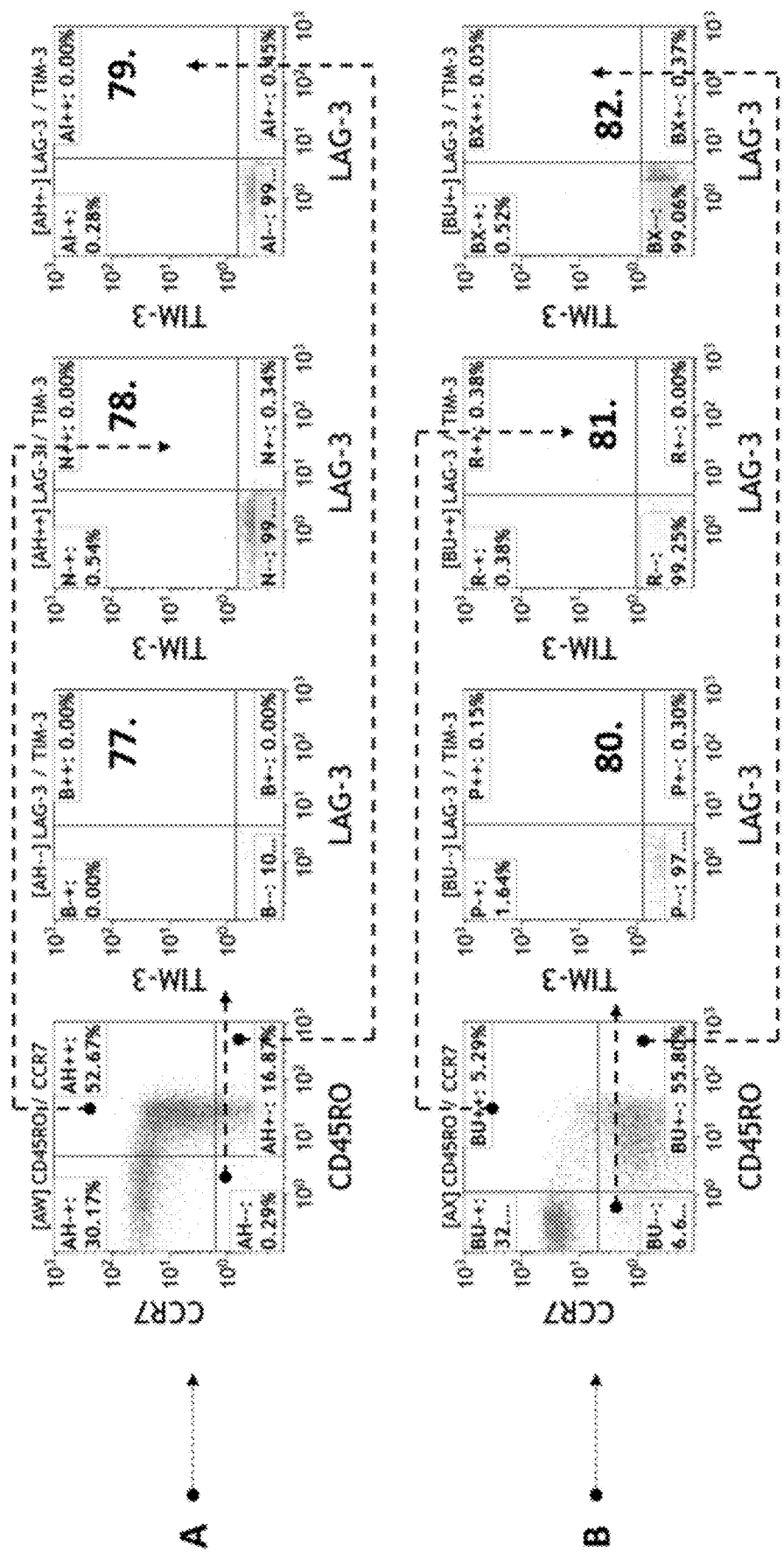

The term "healthy control" as used herein refers to a subject without a disease being studied but may have other conditions indirectly affecting outcome.

The term "characterized immune cell subset" as used herein refers to that a group of immune cell subsets having a comparative immune profiling between patients and healthy controls (HCs), such as amounts of the immune cell subsets in the patients significantly higher or lower than those in the HCs.

The term "predicted probability" as used as herein refers to the probability of the subject for each groups in the trained machine learning model.

The term "decision function" as used herein refers to a function that calculates the distance of the subject to the separating hyperplane of SVM classifier.

The term "hold-out set" as used herein refers to the dataset not used in a machine learning model training process.

EMBODIMENTS

Embodiment 1: A staining kit, including a first pattern including antibodies against T cell, B cell, NK cell, monocyte, regulatory cell, CD8, CD45, and CTLA4; a second pattern including antibodies against T cell, B cell, NK cell, monocyte, regulatory cell, dendritic cell, and CD45; a third pattern including antibodies against T cell, B cell, NK cell, monocyte, CD8, CD45, CD45RA, CD62L, CD197, CX3CR1 and TCR$_{\alpha\beta}$; and a fourth pattern including antibodies against B cell, CD23, CD38, CD40, CD45 and IgM, wherein the antibodies of each pattern are labeled with fluorescent dyes.

Embodiment 2: The staining kit of embodiment 1, wherein the T cell includes CD3, CD4, CD25, CD45RO, CCR7 or any combination thereof; the B cell includes CD10, CD19, CD21, CD127, IgG or any combination thereof; the NK cell includes CD56; the monocyte includes CD14; the regulatory cell includes PD-1, PD-L1, FoxP3 or any combination thereof; and the dendritic cell includes CD11c, HLA-DR or combination thereof Embodiment 3: The staining kit of embodiment 1 or 2, wherein the first pattern including antibodies against CD3, CD4, CD8, CD14, CD19, CD25, CD45, CD56, CTLA4, Foxp3 and PD-1; the second pattern including antibodies against CD3, CD4, CD11c, CD14, CD19, CD45, CD56, HLA-DR, PD-1 and PD-L1; the third pattern including antibodies against CD4, CD8, CD14, CD19, CD45, CD45RA, CD45RO, CD56, CD62L, CD197, CX3CR1 and TCR$_{\alpha\beta}$; and the fourth pattern including antibodies against CD10, CD19, CD21, CD23, CD38, CD40, CD45, CD127, IgG and IgM, wherein the antibodies of each pattern are labeled with fluorescent dyes.

Embodiment 4: The staining kit of embodiment 3, wherein in the first pattern, the antibodies against CD3, CD4, CD8, CD14, CD25, CD45, CD56, CTLA4, Foxp3 and PD-1 are labeled with different fluorescent colors, and the antibodies against CD14 and CD19 are labeled with the same fluorescent color.

Embodiment 5: The staining kit of embodiment 3 or 4, wherein in the second pattern, the antibodies against CD3, CD4, CD11c, CD14, CD19, CD45, CD56, HLA-DR, PD-1 and PD-L1 are labeled with different fluorescent colors.

Embodiment 6: The staining kit of any one of embodiments 3 to 5, wherein in the third pattern, the antibodies against CD4, CD8, CD14, CD45, CD45RA, CD45RO, CD62L, CD197, CX3CR1 and TCR$_{\alpha\beta}$ are labeled with different fluorescent colors, and the antibodies against CD14, CD19 and CD56 are labeled with the same fluorescent color.

Embodiment 7: The staining kit any one of embodiments 3 to 6, wherein in the fourth pattern, the antibodies against CD10, CD19, CD21, CD23, CD38, CD40, CD45, CD127, IgG and IgM are labeled with different fluorescent colors.

Embodiment 8: The staining kit of any one of embodiments 3 to 7, further including at least one of the following patterns: a fifth pattern including antibodies against CD3, CD4, CD8, CD14, CD19, CD25, CD45, CD56, CD69, PD-1, TCR$_{\alpha\beta}$ and TCR$_{\gamma\delta}$; a sixth pattern including antibodies against CD3, CD11b, CD11c, CD13, CD14, CD19, CD33, CD39, CD45, CD56, and HLA-DR; a seventh pattern including antibodies against CD3, CD4, CD8, CD14, CD19, CD27, CD28, CD45, CD56, PD-1, TCR$_{\alpha\beta}$ and TCR$_{\gamma\delta}$; an eighth pattern including antibodies against CD3, CD11b, CD14, CD16, CD19, CD45, CD56, CD64, CD66b, CD123, CD193, CD203c and Siglec-8; and a ninth pattern including antibodies against CD4, CD8, CD14, CD19, CD45, CD45RO, CD56, CX3CR1, CD197, LAG-3, TCR$_{\alpha\beta}$ and TIM-3, wherein the antibodies of each pattern are labeled with fluorescent colors.

Embodiment 9: The staining kit of any one of embodiments 3 to 8, wherein in the fifth pattern, the antibodies against CD3, CD4, CD8, CD25, CD45, CD56, CD69, PD-1, TCR$_{\alpha}$p and TCR$_{\gamma\delta}$ are labeled with different fluorescent colors, and the antibodies against CD3, CD14 and CD19 are labeled with the same fluorescent color.

Embodiment 10: The staining kit of any one of embodiments 3 to 9, wherein in the sixth pattern, the antibodies against CD3, CD11b, CD11c, CD13, CD14, CD33, CD39, CD45, and HLA-DR are labeled with different fluorescent colors, and the antibodies against CD3, CD19 and CD 56 are labeled with the same fluorescent color.

Embodiment 11: The staining kit of any one of embodiments 3 to 10, wherein in the seventh pattern, the antibodies against CD3, CD4, CD8, CD27, CD28, CD45, CD56, PD-1, TCR$_{\alpha\beta}$ and TCR$_{\gamma\delta}$ are labeled with different fluorescent colors, and the antibodies against CD3, CD14 and CD19 are labeled with the same fluorescent color.

Embodiment 12: The staining kit of any one of embodiments 3 to 11, wherein in the eighth pattern, the antibodies against CD3, CD11b, CD16, CD45, CD64, CD66b, CD123, CD193, CD203c and Siglec-8 are labeled with different fluorescent colors, and the antibodies against CD3, CD14, CD19 and CD56 are labeled with the same fluorescent color.

Embodiment 13: The staining kit of any one of embodiments 3 to 12, wherein in the ninth pattern, the antibodies against CD4, CD8, CD14, CD45, CD45RO, CX3CR1, CD197, LAG-3, TCR$_{\alpha\beta}$ and TIM-3 are labeled with different fluorescent colors, and the antibodies against CD14, CD19 and CD56 are labeled with the same fluorescent color.

Embodiment 14: A method of identifying characterized immune cell subsets of a disease, including steps of:
(a) obtaining peripheral blood mononuclear cells (PBMCs) and/or white blood cells (WBCs) from a plurality of healthy controls and a plurality of patients having the disease, respectively;
(b) staining the PBMCs and/or the WBCs of the healthy controls and the patients, respectively, by using the staining kit of any one of embodiments 1 to 13;
(c) performing data acquisition of fluorescent intensity of each antibody bound to the PBMCs and/or the WBCs of the healthy controls and the patients, respectively, by using flow cytometry;
(d) identifying immune cell subsets in the PBMCs and/or the WBCs of the healthy controls and the patients, respectively, by using a pedigree method to obtain a dataset including data related to types of the immune cell subsets and proportions thereof; and
(e) evaluating the dataset by using a machine learning software to obtain immune cell subsets of the patients distinguishable from those of the healthy controls as the characterized immune cell subsets of the disease.

Embodiment 15: The method of embodiment 14, wherein the step (e) further includes the following steps performed by the machine learning software:
(i) performing data preprocessing of the dataset;
(ii) performing a feature selection from the preprocessed data by using a Boruta algorithm to obtain predetermined immune cell subsets of the disease as selected features; and
(iii) applying data of the selected features to train machine learning models by at least one of a random forest (RF) algorithm, a logistic regression (LR) algorithm and a support vector machines (SVM) algorithm.

Embodiment 16: The method of embodiment 14 or 15, wherein the disease includes a cancer, an immunological disease and an infectious disease.

Embodiment 17: The method of any one of embodiments 14 to 16, wherein the immunological disease includes, but are not limited to, idiopathic thrombocytopenic purpura, Guillain-Barre syndrome, myasthenia gravis, multiple sclerosis, optic neuritis, Kawasaki's disease, rheumatoid arthritis, systemic lupus erythematosus, atopic dermatitis, atherosclerosis, coronary artery disease, cardiomyopathy, reactive arthritis, Crohn's disease, ulcerative colitis, graft versus host disease, and type 1 diabetes mellitus Embodiment 18: The method of any one of embodiments 14 to 16, wherein the infectious disease includes, but are not limited to, candidiasis, candidemia, aspergillosis, streptococcal pneumonia, streptococcal skin and oropharyngeal conditions, gram negative sepsis, tuberculosis, mononucleosis, influenza, respiratory illness caused by respiratory syncytial virus, human immunodeficiency virus, Hepatitis B, Hepatitis C, malaria, schistosomiasis, methicillin-resistant Staph aureus, vancomycin-resistant *Enterococcus*, carbapenem-resistant and carbapenemase-producing Enterobacteriaceae, mycobacterial disease, and trypanosomiasis.

Embodiment 19: The method of any one of embodiments 14 to 16, wherein the cancer includes, but are not limited to, brain cancer, bone cancer, skin cancer, esophageal cancer, stomach cancer, bile duct cancer, colorectal cancer, head and neck cancer, kidney cancer, fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, meningioma, melanoma, neuroblastoma, retinoblastoma, leukemia, lymphoma, multiple myeloma, Waldenstrom's macroglobulinemia, myelodysplastic disease, heavy chain disease, neuroendocrine tumors and Schwanoma.

Embodiment 20: The method of embodiment 19, wherein the head and neck cancer includes nasopharyngeal carcinoma (NPC).

Embodiment 21: The method of any one of embodiments 14 to 20, wherein the characterized immune cell subsets of NPC is selected from the group consisting of memory B cells, monocytes, T cells, naïve CD4 αβ T cells, PD-1$^+$CD4 T cells, PD-L1$^+$ CD4 T cells, PD-1$^+$PD-L1$^+$ monocytes, CD4 NKTreg cells, MHC II$^+$ CD4 T cells and MHC II$^+$ CD4 NKT cells.

Embodiment 22: A method of predicting the likelihood of nasopharyngeal carcinoma (NPC) in a subject in need thereof, including steps of:
(a) staining peripheral blood mononuclear cells (PBMCs) from the subject by using the staining kit of any one of embodiments 1 to 13;
(b) performing data acquisition of fluorescent intensity of each antibody bound to characterized immune cell subsets of NPC by using flow cytometry to obtain a dataset including data related to types of the characterized immune cell subsets and proportions thereof; and
(c) evaluating the dataset by using a machine learning software to predict whether the subject has nasopharyngeal carcinoma,
wherein the characterized immune cell subsets of NPC are elected from the group consisting of memory B cells, monocytes, T cells, naïve CD4 αβ T cells, PD-1$^+$CD4 T cells, PD-L1$^+$ CD4 T cells, PD-1$^+$PD-L1$^+$ monocytes, CD4 NKTreg cells, MHC II$^+$ CD4 T cells and MHC II$^+$ CD4 NKT cells.

Embodiment 23: The method of embodiment 22, wherein the step (c) further includes the following steps performed by the machine learning software:
(i) applying the hold-out set with the characterized immune cell subsets to test trained machine learning models;
(ii) predicting the subject as nasopharyngeal carcinoma if a value of the predicted probability obtained from a RF algorithm or a LR algorithm is larger than a first threshold value, or a value of a decision function obtained from a SVM algorithm is larger than a second threshold value.

Embodiment 24: The method of embodiment 22 or 23, wherein the first threshold value of the predicted probability is equal 0.5, and the second threshold value of the decision function is equal to 0.

Example 1: Identifying Characterized Immune Cell Subsets of NPC

Please see FIG. 1 for a flow chart of identifying the characterized immune cell subsets of NPC. The related steps thereof are described in detail below.

NPCs and HCs

For NPCs, eligible criteria included: older than 20 years, heavier than 50 kilograms, newly diagnosed according to the practical guideline, no history of severe infectious diseases such as human immunodeficiency virus and syphilis, no radiotherapy, chemotherapy, or autoimmune treatment received within one month. Patients with central nerve system metastasis, pulmonary fibrosis or fibrotic pneumonia, and pulmonary edema or ascites fitted Common Terminology Criteria for Adverse Events (CTCAE) level 2 or higher were ineligible. Subjects enrolled in HCs had the same eligibility criteria as NPCs except for NPC diagnosed. The outcome of this trial relied on the comparison of the typing and proportion of immune cell subsets between NPCs and the HCs. Therefore, the clinician drew 20 mL of anticoagulated peripheral blood from the subjects for PBMCs and granulocyte isolation and identification during a consultation. The study design of this clinical trial complied with the Declaration of Helsinki, and the Institutional Review Board of Far Eastern Memorial Hospital approved the protocol of this clinical trial (Approval code 108170-E).

Reagents and Antibodies

All reagents and antibodies used in this study were listed in Tables 1 and 2. Reagents were from Cytiva (Marlborough, MA, USA), Lonza (Basel, Switzerland), and Sigma-Aldrich (Merck KGaA, Darmstadt, Germany). Antibodies were all from Beckman-Coulter (Brea, CA, USA), Biolegend (San Diego, CA, USA), and Thermo-Fisher (Waltham, MA, USA).

TABLE 1

| Reagents | | |
|---|---|---|
| Name | Manufacture | Catalogue number |
| For PBMCs and granulocyte isolation | | |
| Ficoll-Paque ™ PREMIUM medium 1.077 g/mL | Cytiva | 17544202 |

TABLE 1-continued

Reagents

| Name | Manufacture | Catalogue number |
|---|---|---|
| Phosphate buffer saline | Lonza | BE17-516F |
| ACK lysis buffer | Biolegend | 420301 |
| For immunostaining | | |
| Bovine serum albumin | Sigma-Aldrich | A7030 |
| Sodium azide | Sigma-Aldrich | S2002 |
| Foxp3/Transcription Factor Staining Buffer Set | Thermo-Fisher | 00-5523-00 |

TABLE 2

Antibodies and fluorescent dyes conjugated therewith

| Target | Conjugation | Host | Manufacture | Catalogue number |
|---|---|---|---|---|
| CCR7 (also called "CD197") | PE/Cy7 | Mouse | Biolegend | 353226 |
| CD3 | APC-AF750 | Mouse | Beckman Coulter | A66329 |
| CD3 | KO | Mouse | Beckman Coulter | B00068 |
| CD4 | APC-AF700 | Mouse | Beckman Coulter | B10824 |
| CD4 | PE-Cy7 | Mouse | Beckman Coulter | 6607101 |
| CD8 | KO | Mouse | Beckman Coulter | B00067 |
| CD8 | PB | Mouse | Biolegend | 301023 |
| CD10 | PE/Cy7 | Mouse | Biolegend | 312214 |
| CD11b | PE/Cy7 | Mouse | Beckman Coulter | A54822 |
| CD11c | APC | Mouse | Biolegend | 301614 |
| CD13 | PerCP/Cy5.5 | Mouse | Biolegend | 301714 |
| CD14 | APC-AF750 | Mouse | Beckman Coulter | A86052 |
| CD14 | PB | Mouse | Beckman Coulter | B00846 |
| CD14 | PC5.5 | Mouse | Beckman Coulter | A70204 |
| CD16 | KC | Mouse | Beckman Coulter | B00069 |
| CD19 | APC-AF750 | Mouse | Beckman Coulter | A78838 |
| CD21 | APC | Mouse | Biolegend | 354906 |
| CD23 | PE | Mouse | Biolegend | 338508 |
| CD25 | PE | Mouse | Biolegend | 302606 |
| CD25 | BB515 | Mouse | BD | 564467 |
| CD27 | PB | Mouse | Biolegend | 356414 |
| CD28 | PE/Cy5 | Mouse | Biolegend | 302910 |
| CD33 | FITC | Mouse | Beckman Coulter | IM1135U |
| CD38 | PerCP/Cy5.5 | Mouse | Biolegend | 356614 |
| CD39 | PE | Mouse | Biolegend | 328208 |
| CD40 | FITC | Mouse | Biolegend | 334306 |
| CD45 | ECD | Mouse | Beckman Coulter | A07784 |
| CD45RA | PerCP/Cy5.5 | Mouse | Biolegend | 304121 |
| CD45RO | APC | Mouse | Biolegend | 304210 |
| CD56 | APC-AF700 | Mouse | Beckman Coulter | B10822 |
| CD56 | APC/Cy7 | Mouse | Biolegend | 318332 |
| CD62L | PB | Mouse | Biolegend | 304825 |
| CD64 | A700 | Mouse | Biolegend | 305040 |
| CD66b | PB | Mouse | Biolegend | 305112 |
| CD69 | PB | Mouse | Biolegend | 310919 |
| CD123 | PE | Mouse | Biolegend | 306006 |
| CD127 | BV421 | Mouse | Biolegend | 351310 |
| CD193 | FITC | Mouse | Biolegend | 310720 |
| CD203c | APC | Mouse | Biolegend | 354906 |
| CTLA4 | PE | Mouse | Biolegend | 349906 |
| CX3CR1 | PE | Mouse | Biolegend | 341604 |
| Foxp3 | APC | Mouse | Thermo-Fisher | 17-4777-42 |
| HLA-DR (also called "MHC II") | PB | Mouse | Beckman Coulter | A74781 |
| HLA-DR (also called "MHC II") | KO | Mouse | Beckman Coulter | B00070 |
| IgG | BV510 | Mouse | BD | 563247 |
| IgM | A700 | Mouse | Biolegend | 314538 |
| PD-1 | A488 | Mouse | Biolegend | 329936 |
| PD-1 | PE | Mouse | Biolegend | 329906 |
| PD-1 | PerCP/Cy5.5 | Mouse | Biolegend | 329914 |
| PD-L1 | PE | Mouse | Biolegend | 329706 |
| Siglec-8 | PerCP/Cy5.5 | Mouse | Biolegend | 347108 |
| TCR$_{\alpha\beta}$ | FITC | Mouse | Biolegend | 306705 |
| TCR$_{\gamma\delta}$ | APC | Mouse | Biolegend | 331212 |
| LAG-3 | PerCP/Cy5.5 | Mouse | Biolegend | 369312 |
| TIM-3 | PB | Mouse | Biolegend | 345042 |

PBMCs and Granulocyte Isolation and Immunostaining

EDTA-anti coagulated peripheral blood (abbreviated as whole blood in the following) was aliquoted into two in which one was for PBMCs isolation and the other was for granulocyte isolation. For PBMCs isolation, whole blood mixed with an aliquot of PBS was loaded into Ficoll-preloaded centrifuged tubes and centrifuged with 930×g (X-15R, Beckman-Coulter) for 30 minutes at room temperature. PBMCs were collected from the buffy coat and washed by PBS followed by being centrifuged with 750×g for 7 minutes, and then re-suspended for stained buffer (0.5% bovine serum albumin/PBS with 0.02% (w/v) sodium azide) and went through immunostaining.

The ammonium-chloride-potassium (ACK) lysis method was applied for the lysis of red blood cells (RBCs) in granulocyte isolation based on the protocol in the manual of the lysis buffer. Briefly, one part of whole blood mixed with twenty part of ACK lysis buffer followed by gently shaking at room temperature for 10 minutes. Then, the mixture was centrifuged with 400×g for 5 minutes to eliminate the lysed erythrocyte. The remaining white blood cells (WBCs) was washed by PBS and followed by immunostaining.

All PBMCs were stained with cell surface markers and a part of them was further stained with intracellular cell markers. Each pattern see the cell staining pattern page. All staining procedures were kept in dark. All staining procedure were kept in dark. For surface marker staining, PBMCs were directly incubated with desired antibodies labeled with fluorescent dyes in the staining kit (see Tables 2 and 3) for 10 minutes at 4° C. For intracellular marker staining, a part of surface marker labeled PBMCs was fixed and permeabilized using Foxp3/Transcription Factor Staining Buffer Set (eBioscience™) with recommended protocol from manual. Later, permeabilized PBMCs were stained with CTLA4 or Foxp3 for 30 minutes at room temperature. Afterward, stained PBMCs were washed with staining buffer once and followed by analysis by flow cytometer.

TABLE 3

Staining kit

| Codes of Patterns/Dyes | PT-64 | PT-65 | PT-66 | PT-67 | PT-68 |
|---|---|---|---|---|---|
| FL1 | FITC-TCR$_{\alpha\beta}$ | BB515-CD25 | FITC-CD33 | FITC-PD-1 | FITC-TCR$_{\alpha\beta}$ |
| FL2 | PE-CD25 | PE-CTLA4 | PE-CD39 | PE-PD-L1 | PE-PD-1 |
| FL3 | ECD-CD45 | ECD-CD45 | ECD-CD45 | ECD-CD45 | ECD-CD45 |
| FL4 | PerCP/Cy5.5-PD-1 | PerCP/Cy5.5-PD-1 | PerCP/Cy5.5-CD13 | PerCP/Cy5.5-CD14 | PE/Cy5-CD28 |
| FL5 | PE/Cy7-CD4 | PE/Cy7-CD4 | PE/Cy7-CD11b | PE/Cy7-CD4 | PE/Cy7-CD4 |
| FL6 | APC-TCR$_{\gamma\delta}$ | APC-Foxp3 | APC-CD11c | APC-CD11c | APC-TCR$_{\gamma\delta}$ |
| FL7 | APC-AF700-CD56 | APC-AF700-CD56 | | APC-AF700-CD56 | APC-AF700-CD56 |
| FL8 | APC-AF750-CD3 | | APC-AF750-CD3 APC/Cy7-CD56 | | APC-AF750-CD3 |
| | APC-AF750-CD14 | APC-AF750-CD14 | | | APC-AF750-CD14 |
| | APC-AF750-CD19 | APC-AF750-CD19 | APC-AF750-CD19 | APC-AF750-CD19 | APC-AF750-CD19 |
| FL9 | PB-CD69 | PB-CD8 | PB-CD14 | PB-HLA-DR | PB-CD27 |
| FL10 | KO-CD8 | KO-CD3 | KO-HLA-DR | KO-CD3 | KO-CD3 |

| Codes of Patterns/Dyes | PT-83 | PT-85 | PT-86 | PT-87 |
|---|---|---|---|---|
| FL1 | FITC-CD193 | FITC-TCR$_{\alpha\beta}$ | FITC-TCR$_{\alpha\beta}$ | FITC-CD40 |
| FL2 | PE-CD123 | PE-CX3CR1 | PE-CX3CR1 | PE-CD23 |
| FL3 | ECD-CD45 | ECD-CD45 | ECD-CD45 | ECD-CD45 |
| FL4 | PerCP/Cy5.5-Siglec-8 | PerCP/Cy5.5-CD45RA | PerCP/Cy5.5-LAG-3 | PerCP/Cy5.5-CD38 |
| FL5 | PE/Cy7-CD11b | PE/Cy7-CD197 | PE/Cy7-CD197 | PE/Cy7-CD10 |
| FL6 | APC-CD203c | APC-CD45RO | APC-CD45RO | APC-CD21 |
| FL7 | A700-CD64 | APC-AF700-CD4 | APC-AF700-CD4 | A700-IgM |
| FL8 | APC-AF750-CD3 | | | |
| | APC/Cy7-CD56 | APC/Cy7-CD56 | APC/Cy7-CD56 | |
| | APC-AF750-CD14 | APC-AF750-CD14 | APC-AF750-CD14 | |
| | APC-AF750-CD19 | APC-AF750-CD19 | APC-AF750-CD19 | APC-AF750-CD19 |
| FL9 | PB-CD66b | PB-CD62L | PB-TIM-3 | PB-CD127 |
| FL10 | KO-CD16 | KO-CD8 | KO-CD8 | BV510-IgG |

Data Acquisition and Data Modulation

For data acquisition, the fluorescent intensity of PBMCs was measured by flow cytometer (Navios, Beckman Coulter), and raw data were collected by Kaluza analysis software V1.3 (Beckman Coulter). Immune cell subsets were defined by a pedigree method using filtration with two-marker sets (parameter of X-axis and Y-axis). The definition of cell subsets were listed in Table 4. As shown in FIGS. 2a-2k, the detailed filtrating processes were performed based on Table 4 so as to obtain the raw dataset related to at least 82 types of immune cell subsets and proportions thereof.

TABLE 4

Definition of immune cell subsets with markers

| Name of cell subsets | Markers |
|---|---|
| Granulocytes | |
| Neutrophil | CD3$^-$CD14$^-$CD19$^-$CD56$^-$CD11b$^+$CD16$^+$CD64$^-$CD66b$^+$CD123$^-$CD193$^-$ |
| Eosinophil | CD3$^-$CD14$^-$CD19$^-$CD56$^-$CD11b$^+$CD16$^-$CD66b$^+$CD123$^+$CD193$^+$ |
| Basophil | CD3$^-$CD14$^-$CD19$^-$CD56$^-$CD11b$^+$CD16$^-$CD66b$^-$CD123$^+$CD193$^+$ |
| NK cell | |
| NK cell | CD3$^-$CD14$^-$CD19$^-$CD56$^+$ |
| CD8 NK cell | CD3$^-$CD14$^-$CD19$^-$CD56$^+$CD4$^-$CD8$^+$ |
| DN NK cell | CD3$^-$CD14$^-$CD19$^-$CD56$^+$CD4$^-$CD8$^-$ |

TABLE 4-continued

Definition of immune cell subsets with markers

| Name of cell subsets | Markers |
| --- | --- |
| NKT cell | |
| NKT cell | $CD3^+CD14^-CD19^-CD56^+$ |
| CD4 NKT cell | $CD3^+CD14^-CD19^-CD56^+CD4^+CD8^-$ |
| CD8 NKT cell | $CD3^+CD14^-CD19^-CD56^+CD4^-CD8^+$ |
| Dendritic cell | |
| DC | $CD3^-CD14^-CD19^-CD56^-CD11c^+$ |
| MHC II$^+$ DC | $CD3^-CD14^-CD19^-CD56^-CD11c^+MHC\,II^+$ |
| B cell | |
| B cell | $CD3^-CD14^-CD19^+CD56^-$ |
| Long lived plasma cell | $CD3^-CD14^-CD19^+CD56^-CD21^+CD127^-CD10^+IgG^+IgM^-$ |
| Germinal center B cell | $CD3^-CD14^-CD19^+CD56^-CD21^-CD127^-CD10^+IgG^+IgM^-$ |
| Memory B cell | $CD3^-CD14^-CD19^+CD56^-CD21^+CD127^-CD10^-CD23^-CD38^+IgG^+IgM^-$ |
| Follicular B cell | $CD3^-CD14^-CD19^+CD56^-CD21^+CD127^-CD10^-CD23^-CD38^+IgG^+IgM^{dim}$ |
| Short lived plasma cell | $CD3^-CD14^-CD19^+CD56^-CD21^+CD127^-CD10^-CD23^-CD38^+IgG^+IgM^{dim}$ |
| Marginal Zone B cell | $CD3^-CD14^-CD19^+CD56^-CD21^+CD127^-CD10^-CD23^-CD38^+IgG^+IgM^{hi}$ |
| Transitional B cell | $CD3^-CD14^-CD19^+CD56^-CD21^-CD127^-CD10^+CD23^-CD38^+IgG^+IgM^{hi}$ |
| MHC II$^+$ B cell | $CD3^-CD14^-CD19^+CD56^-MHC\,II^+$ |
| Monocyte | |
| Monocyte | $CD3^-CD14^+CD19^+CD56^{dim}$ |
| MHC II$^+$ monocyte | $CD3^-CD14^+CD19^+CD56^{dim}MHC\,II^+$ |
| T lymphocyte | |
| Total T cell | $CD3^+CD14^-CD19^-CD56^-$ |
| CD4 αβ T cell | $CD3^+CD14^-CD19^-CD56^-TCR_{\alpha\beta}^+TCR_{\gamma\delta}^-CD4^+CD8^-$ |
| Terminal CD4 αβ T cell | $CD3^+CD14^-CD19^-CD56^-TCR_{\alpha\beta}^+TCR_{\gamma\delta}^-CD4^+CD8^-CD25^-CD69^+$ |
| Immediately activated CD4 αβ T cell | $CD3^+CD14^-CD19^-CD56^-TCR_{\alpha\beta}^+TCR_{\gamma\delta}^-CD4^+CD8^-CD27^-CD28^-$ |
| Naive CD4 αβ T cell | $CD3^+CD14^-CD19^-CD56^-TCR_{\alpha\beta}^+TCR_{\gamma\delta}^-CD4^+CD8^-CD45RO^-CCR7^+$ |
| Effector CD4 αβ T cell | $CD3^+CD14^-CD19^-CD56^-TCR_{\alpha\beta}^+TCR_{\gamma\delta}^-CD4^+CD8^-CD45RO^-CCR7^-$ |
| Exhausted effector CD4 αβ T cell | $CD3^+CD14^-CD19^-CD56^-TCR_{\alpha\beta}^+TCR_{\gamma\delta}^-CD4^+CD8^-CD45RO^-CCR7^-TIM\text{-}3^+LAG\text{-}3^+$ |
| Central memory CD4 αβ T cell | $CD3^+CD14^-CD19^-CD56^-TCR_{\alpha\beta}^+TCR_{\gamma\delta}^-CD4^+CD8^-CD45RO^+CCR7^+$ |
| Exhausted central memory CD4 αβ T cell | $CD3^+CD14^-CD19^-CD56^-TCR_{\alpha\beta}^+TCR_{\gamma\delta}^-CD4^+CD8^-CD45RO^+CCR7^+TIM\text{-}3^+LAG\text{-}3^+$ |
| Effector memory CD4 αβ T cell | $CD3^+CD14^-CD19^-CD56^-TCR_{\alpha\beta}^+TCR_{\gamma\delta}^-CD4^+CD8^-CD45RO^+CCR7^-$ |
| Exhausted effector memory CD4 αβ T cell | $CD3^+CD14^-CD19^-CD56^-TCR_{\alpha\beta}^+TCR_{\gamma\delta}^-CD4^+CD8^-CD45RO^+CCR7^-TIM\text{-}3^+LAG\text{-}3^+$ |
| CD8 αβ T cell | $CD3^+CD14^-CD19^-CD56^-TCR_{\alpha\beta}^+TCR_{\gamma\delta}^-CD4^-CD8^+$ |
| Terminal CD8 αβ T cell | $CD3^+CD14^-CD19^-CD56^-TCR_{\alpha\beta}^+TCR_{\gamma\delta}^-CD4^-CD8^+CD25^-CD69^+$ |
| Immediately activated CD8 αβ T cell | $CD3^+CD14^-CD19^-CD56^-TCR_{\alpha\beta}^+TCR_{\gamma\delta}^-CD4^-CD8^+CD27^-CD28^-$ |
| Naive CD8 αβ T cell | $CD3^+CD14^-CD19^-CD56^-TCR_{\alpha\beta}^+TCR_{\gamma\delta}^-CD4^-CD8^+CD45RO^-CCR7^+$ |
| Effector CD8 αβ T cell | $CD3^+CD14^-CD19^-CD56^-TCR_{\alpha\beta}^+TCR_{\gamma\delta}^-CD4^-CD8^+CD45RO^-CCR7^-$ |
| Exhausted effector CD8 αβ T cell | $CD3^+CD14^-CD19^-CD56^-TCR_{\alpha\beta}^+TCR_{\gamma\delta}^-CD4^-CD8^+CD45RO^-CCR7^-TIM\text{-}3^+LAG\text{-}3^+$ |
| Central memory CD8 αβ T cell | $CD3^+CD14^-CD19^-CD56^-TCR_{\alpha\beta}^+TCR_{\gamma\delta}^-CD4^-CD8^+CD45RO^+CCR7^+$ |
| Exhausted central memory CD8 αβ T cell | $CD3^+CD14^-CD19^-CD56^-TCR_{\alpha\beta}^+TCR_{\gamma\delta}^-CD4^-CD8^+CD45RO^+CCR7^+TIM\text{-}3^+LAG\text{-}3^+$ |
| Effector memory CD8 αβ T cell | $CD3^+CD14^-CD19^-CD56^-TCR_{\alpha\beta}^+TCR_{\gamma\delta}^-CD4^-CD8^+CD45RO^+CCR7^-$ |
| Exhausted effector memory CD8 αβ T cell | $CD3^+CD14^-CD19^-CD56^-TCR_{\alpha\beta}^+TCR_{\gamma\delta}^-CD4^-CD8^+CD45RO^+CCR7^-TIM\text{-}3^+LAG\text{-}3^+$ |
| CD8 γδ T cell | $CD3^+CD14^-CD19^-CD56^-TCR_{\alpha\beta}^-TCR_{\gamma\delta}^+CD4^-CD8^+$ |
| DN γδ T cell | $CD3^+CD14^-CD19^-CD56^-TCR_{\alpha\beta}^-TCR_{\gamma\delta}^+CD4^-CD8^-$ |
| PD-1$^+$ cells | |
| PD-1$^+$ NK cell | $CD3^-CD14^-CD19^-CD56^+PD\text{-}1^+PD\text{-}L1^-$ |
| PD-1$^+$ CD4 NKT cell | $CD3^+CD14^-CD19^-CD56^+CD4^+CD8^-PD\text{-}1^+PD\text{-}L1^-$ |
| PD-1$^+$ CD8 NKT cell | $CD3^+CD14^-CD19^-CD56^+\,CD4^-CD8^+PD\text{-}1^+PD\text{-}L1^-$ |
| PD-1$^+$ DC | $CD3^-CD14^-CD19^-CD56^-CD11c^+PD\text{-}1^+PD\text{-}L1^-$ |
| PD-1$^+$ monocyte | $CD3^-CD14^+CD19^+CD56^{dim}PD\text{-}1^+PD\text{-}L1^-$ |
| PD-1$^+$ B cell | $CD3^-CD14^-CD19^+CD56^-PD\text{-}1^+PD\text{-}L1^-$ |
| PD-1$^+$ CD4 T cell | $CD3^+CD14^-CD19^-CD56^-CD4^+CD8^-PD\text{-}1\text{+}PD\text{-}L1^-$ |
| PD-1$^+$ CD8 T cell | $CD3^+CD14^-CD19^-CD56^-CD4^-CD8^+PD\text{-}1\text{+}PD\text{-}L1^-$ |

TABLE 4-continued

Definition of immune cell subsets with markers

| Name of cell subsets | Markers |
|---|---|
| PD-L1$^+$ cells | |
| PD-L1$^+$ NK cell | CD3$^-$CD14$^-$CD19$^-$CD56$^+$PD-1$^-$PD-L1$^+$ |
| PD-L1$^+$ CD4 NKT cell | CD3$^+$CD14$^-$CD19$^-$CD56$^+$CD4$^+$CD8$^-$PD-1$^-$PD-L1$^+$ |
| PD-L1$^+$ CD8 NKT cell | CD3$^+$CD14$^-$CD19$^-$CD56$^+$ CD4$^-$CD8$^+$PD-1$^-$PD-L1$^+$ |
| PD-L1$^+$ DC | CD3$^-$CD14$^-$CD19$^-$CD56$^-$CD11c$^+$PD-1$^-$PD-L1$^+$ |
| PD-L1$^+$ monocyte | CD3$^-$CD14$^+$CD19$^-$CD56$^{dim}$PD-1$^-$PD-L1$^+$ |
| PD-L1$^+$ B cell | CD3$^-$CD14$^-$CD19$^+$CD56$^-$PD-1$^-$PD-L1$^+$ |
| PD-L1$^+$ CD4 T cell | CD3$^+$CD14$^-$CD19$^-$CD56$^-$CD4$^+$CD8$^-$PD-1$^-$PD-L1$^+$ |
| PD-L1$^+$ CD8 T cell | CD3$^+$CD14$^-$CD19$^-$CD56$^-$CD4$^-$CD8$^+$PD-1$^-$PD-L1$^+$ |
| PD-1$^+$ PD-L1$^+$ cells | |
| PD-1$^+$ PD-L1$^+$ NK cell | CD3$^-$CD14$^-$CD19$^-$CD56$^+$PD-1$^+$PD-L1$^+$ |
| PD-1$^+$ PD-L1$^+$ CD4 NKT cell | CD3$^+$CD14$^-$CD19$^-$CD56$^+$CD4$^+$CD8$^-$PD-1$^+$PD-L1$^+$ |
| PD-1$^+$ PD-L1$^+$ CD8 NKT cell | CD3$^+$CD14$^-$CD19$^-$CD56$^+$ CD4$^-$CD8$^+$PD-1$^+$PD-L1$^+$ |
| PD-1$^+$ PD-L1$^+$ DC | CD3$^-$CD14$^-$CD19$^-$CD56$^-$CD11c$^+$PD-1$^+$PD-L1$^+$ |
| PD-1$^+$ PD-L1$^+$ monocyte | CD3$^-$CD14$^+$CD19$^-$CD56$^{dim}$PD-1$^+$PD-L1$^+$ |
| PD-1$^+$ PD-L1$^+$ B cell | CD3$^-$CD14$^-$CD19$^+$CD56$^-$PD-1$^+$PD-L1$^+$ |
| PD-1$^+$ PD-L1$^+$ CD4 T cell | CD3$^+$CD14$^-$CD19$^-$CD56$^-$CD4$^+$CD8$^-$PD-1$^+$PD-L1$^+$ |
| PD-1$^+$ PD-L1$^+$ CD8 T cell | CD3$^+$CD14$^-$CD19$^-$CD56$^-$CD4$^-$CD8$^+$PD-1$^+$PD-L1$^+$ |
| Regulatory cells | |
| CD4 Treg cell | CD3$^+$CD14$^-$CD19$^-$CD56$^-$CD4$^+$CD8$^-$FoxP3$^+$CD25$^+$ |
| CD8 Treg cell | CD3$^+$CD14$^-$CD19$^-$CD56$^-$CD4$^-$CD8$^+$FoxP3$^+$CD25$^+$ |
| CD8 NKreg cell | CD3$^-$CD14$^-$CD19$^-$CD56$^+$CD4$^-$CD8$^+$FoxP3$^+$CD25$^+$ |
| DN NKreg cell | CD3$^-$CD14$^-$CD19$^-$CD56$^+$CD4$^-$CD8$^-$FoxP3$^+$CD25$^+$ |
| CD4 NKreg cell | CD3$^+$CD14$^-$CD19$^-$CD56$^+$CD4$^+$CD8$^-$FoxP3$^+$CD25$^+$ |
| CD8 NKreg cell | CD3$^+$CD14$^-$CD19$^-$CD56$^+$CD4$^-$CD8$^+$FoxP3$^+$CD25$^+$ |
| MHC II$^-$ MDSC | CD3$^-$CD14$^+$CD19$^-$CD56$^-$CD11b$^+$MHC II$^-$ |
| MHC II$^{dim}$ MDSC | CD3$^-$CD14$^+$CD19$^-$CD56$^-$CD11b$^+$MHC II$^{dim}$ |
| MHC II$^+$ NK cell | CD3$^-$CD14$^-$CD19$^-$CD56$^+$MHC II$^+$ |
| MHC II$^+$ CD4 NKT cell | CD3$^+$CD14$^-$CD19$^-$CD56$^+$CD4$^+$CD8$^-$MHC II$^+$ |
| MHC II$^+$ CD8 NKT cell | CD3$^+$CD14$^-$CD19$^-$CD56$^+$CD4$^-$CD8$^+$MHC II$^+$ |
| MHC II$^+$ CD4 T cell | CD3$^+$CD14$^-$CD19$^-$CD56$^-$CD4$^+$CD8$^-$MHC II$^+$ |
| MHC II$^+$ CD8 T cell | CD3$^+$CD14$^-$CD19$^-$CD56$^-$CD4$^-$CD8$^+$MHC II$^+$ |

Machine Learning with Python Program

Figure 3A:
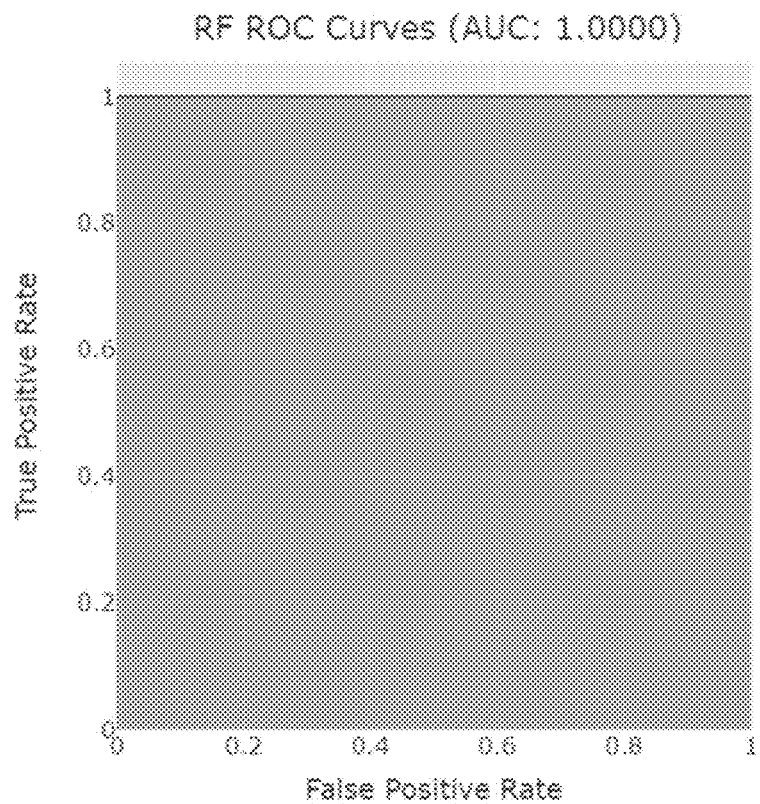
FIGS. 3A-3C illustrate the ROC results of the training set acquired from the machine learning method using the random forest (RF) algorithm, logistic regression (LR) algorithm, and support vector machines (SVM) algorithm, respectively.
Figure 3B:
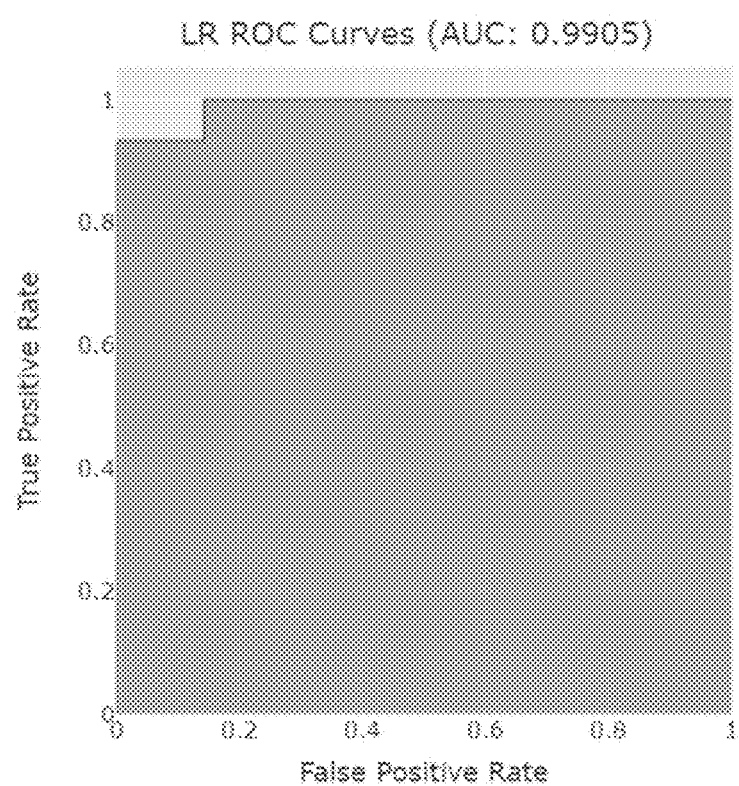
Figure 3C:
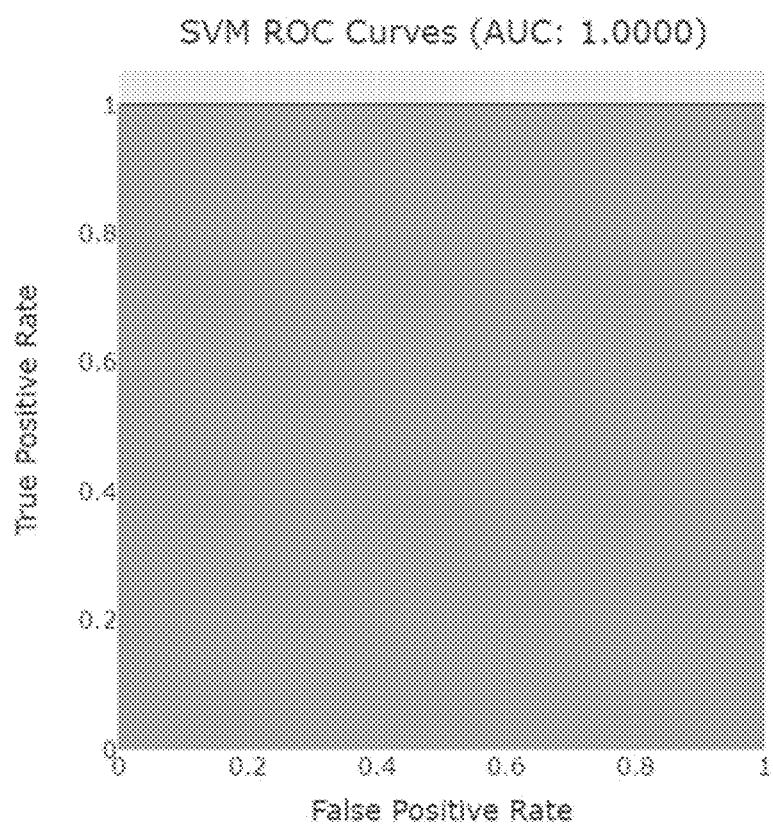
Figure 4A:
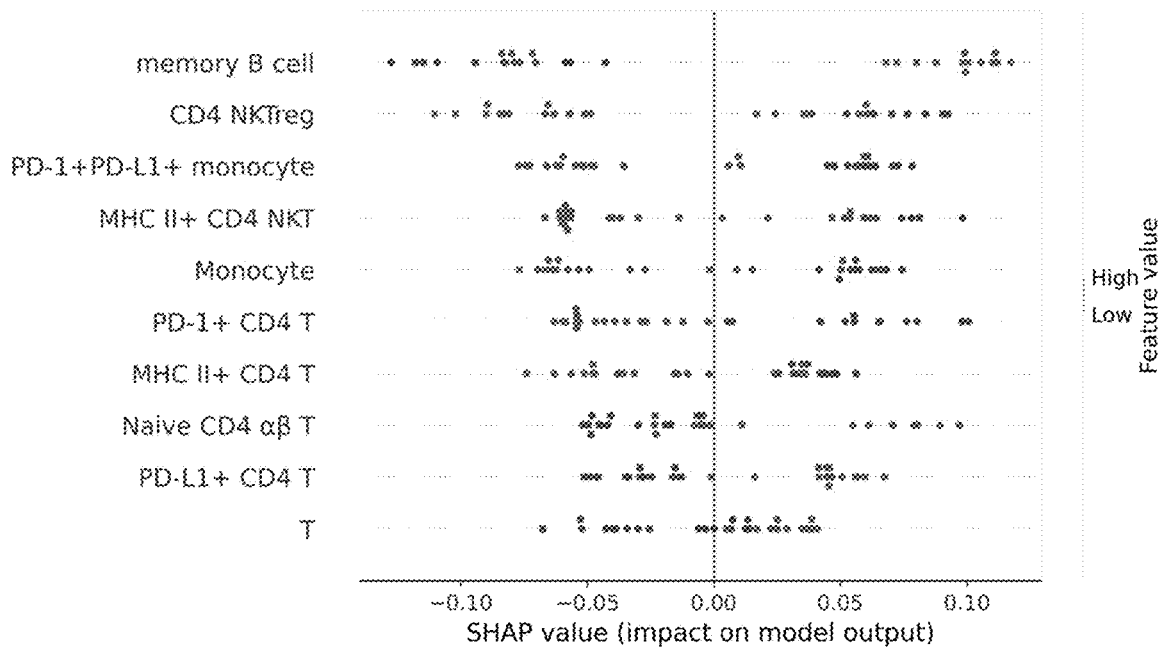
FIGS. 4A-4C illustrate the SHAP results of the training set acquired from the machine learning method using the RF algorithm, the LR algorithm, and the SVM algorithm, respectively.
Figure 4B:
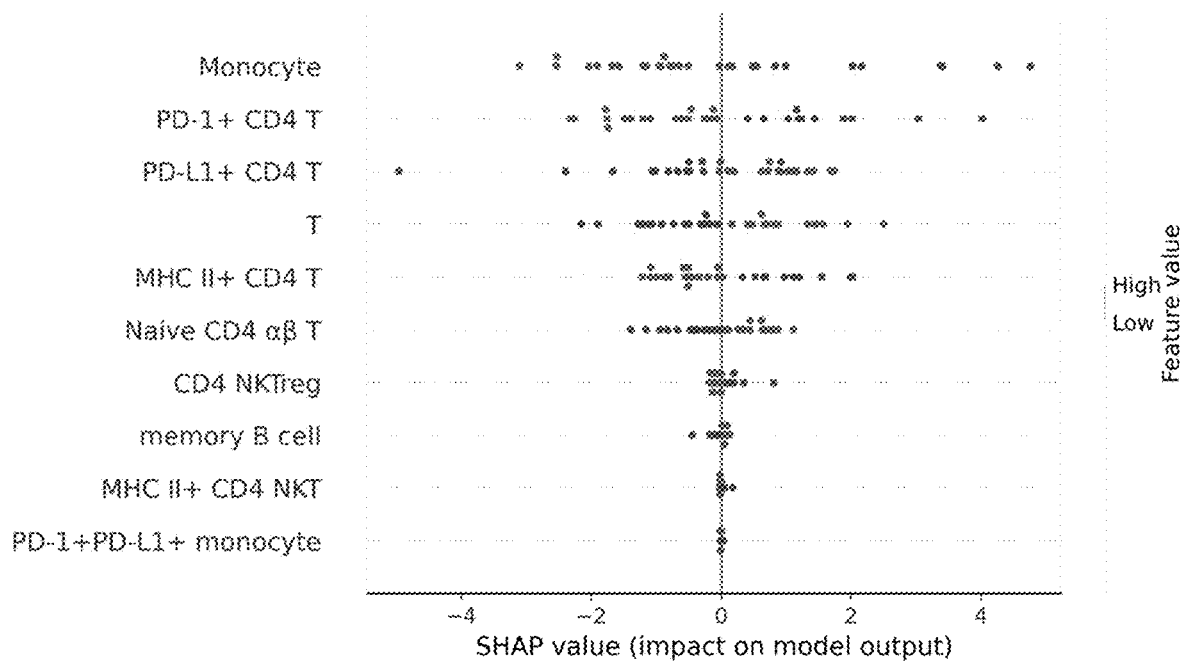
Figure 4C:
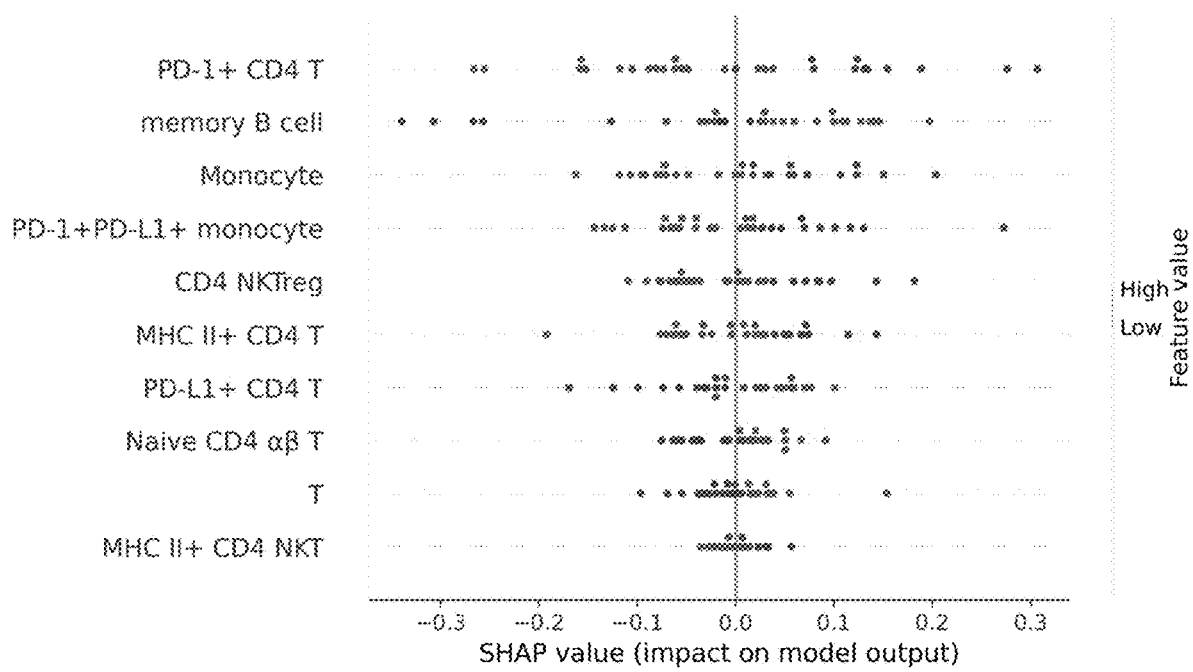

The raw dataset described above consisted of HC (n=34) and NPC (n=15) subjects. Data preprocessing was performed by the following steps. First, the target labels were converted to the numerical value 0 for HC and the numerical value 1 for NPC. Since one of the NPC subjects had 7 missing values of the pattern PT-87, missing values imputation was applied based on the mean of the other features of NPCs (PT-87). 82 types of immune cell subsets were reserved for each subject after data preprocessing. The hold-out set consisted of some HC subjects (n=20), which were split from the 34 HC subjects, and NPC subjects (n=10), which were based on the percentile and mean of the original 15 NPC subjects. The remaining HC subjects (n=14) and the original NPC subjects (n=15) were used as the training set. Feature selection in the training set was performed using the Boruta algorithm, which is a wrapper-based technique based on the random forest classification algorithm. Boruta compared the Z-scores of the shuffled shadow features and the original features to determine feature importance in every iteration. After the predefined iterations, predetermined immune cell subsets of the disease as selected features were obtained, which are more significantly relevant to classification than randomly permuted features. The selected features of the present example are shown in Table 5. The training set with the selected features was applied to train the models using three different types of machine learning (ML) algorithms. Random Forest (RF), Logistic Regression (LR), and Support Vector Machines (SVM) were used to classify flow cytometry data from 2 classes of HC and NPC subjects. To minimize the impact of the feature with a relatively higher magnitude on the distance calculation, the Min-Max scaling was applied for SVM to ensure that every feature had a similar effect when the classifier constructed the hyperplane. The Min-Max scaling is a normalization technique that transforms the minimal feature value to 0 and the maximal feature value to 1. The discriminative ability of the models was then evaluated by the area under curve (AUC) of the receiver operating characteristic (ROC) curve. The ROC curve is often used to compare the model performance in a clinical classification problem. It shows the relation of the true positive rate (sensitivity) against the false positive rate (1-specificity) for each possibility threshold. The better the discriminative ability of the model, the closer the ROC curve is to the upper left corner of the plot. Finally, the discriminative ability of the models was quantified by computing the area under the ROC curve using the trapezoidal rule to obtain the AUC results. The ROC curves and the AUC results of the training set were visualized to compare the model performance. The plots are shown in FIGS. 3A-3C. The Shapley Additive exPlanations (SHAP) was applied to explain the model by computing the contribution of each selected feature to prediction. The SHAP summary plot was depicted to visualize the ranking of feature importance and the value of the feature per subject with the SHAP values. The color of the data point in each feature represents a high or a low feature value, in which each data point represents one subject. Red indicates high feature value, and blue indicates low feature value. The y-axis of the plot is the feature importance ranking of the selected features, and the x-axis is the SHAP value range. According to the trained model, the higher the SHAP value, the higher the risk of NPC. The summary plots of the training set are shown in FIGS. 4A-4C.

TABLE 5

Selected Features via Boruta algorithm

| Selected features | Selected features |
|---|---|
| Monocyte | MHC II$^+$ CD4 NKT |
| Naïve CD4 αβ T | CD4 NKTreg |
| PD-1$^+$PD-L1$^+$ monocyte | PD-1$^+$ CD4 T |
| PD-1$^+$CD4 T | Memory B |
| MHC II$^+$ CD4 T | T cell |

Example 2: Predicting Likelihood of NPC in Subject by Machine Learning with Python Program The hold-out set consisted of HC (n=20) and pseudo NPC (n=10) based on the percentile and mean of the original 15 NPC subjects. 82 types of immune cell subsets were reserved for each subject. For each subject, 10 selected features shown in Table 5 were used.

The hold-out set with the selected features was applied to test the trained models of three different ML algorithms (RF, LR, and SVM). The trained models were used to classify flow cytometry data from 2 classes of HC and NPC subjects.

For SVM, the Min-Max scaling range obtained from the training process was applied to the hold-out set to ensure that there is no data leakage and that every feature had a similar effect when the classifier constructed the hyperplane.

The sensitivity and specificity of the trained models were then tested using the hold-out set. If the predicted probability of the trained RF or LR model was greater than 0.5, the model predicted the subject as NPC. If the decision function of the trained SVM model was greater than 0, the model predicted the subject as NPC. The prediction results of the hold-out set are shown in Table 6.

TABLE 6

Model performance- Sensitivity and Specificity of the hold-out set

| | Sensitivity and Specificity of the hold-out set (%) | |
|---|---|---|
| Algorithm | HCs (n = 20) | NPCs (n = 10) |
| Random forest | 80.0 | 100.0 |
| Logistic regression | 90.0 | 100.0 |
| Support vector machines | 80.0 | 100.0 |

Finally, the AUC of the ROC curve was used to evaluate the discriminative ability of the models. The ROC curve is often used to compare the model performance in a clinical classification problem. It shows the relation of the true positive rate (sensitivity) against the false positive rate (1-specificity) for each possibility threshold. The better the discriminative ability of the model, the closer the ROC curve is to the upper left corner of the plot.

Figure 5A:
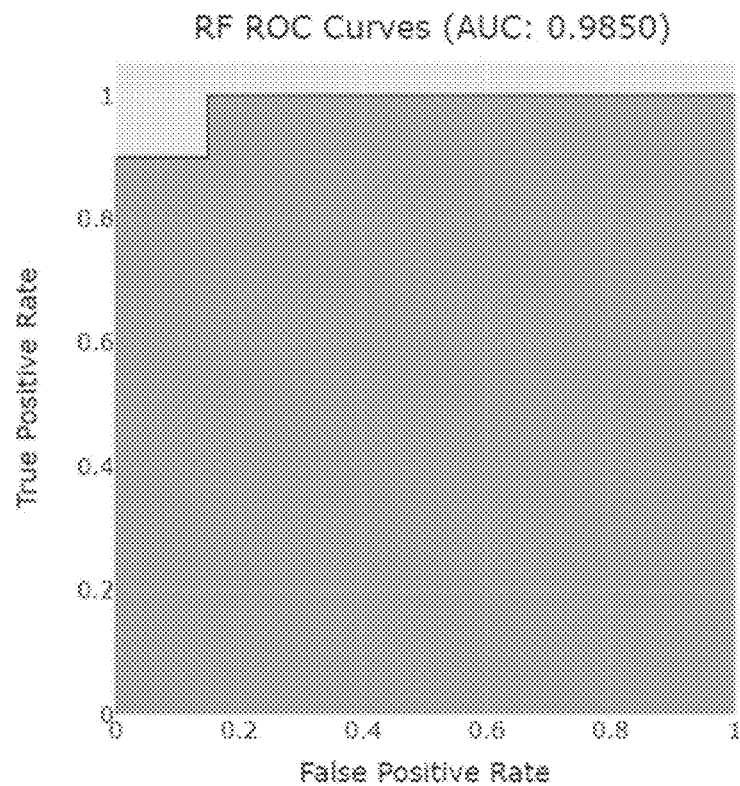
FIGS. 5A-5C illustrate the ROC results of the hold-out set acquired from the machine learning method using the RF algorithm, the LR algorithm, and the SVM algorithm, respectively.
Figure 5B:
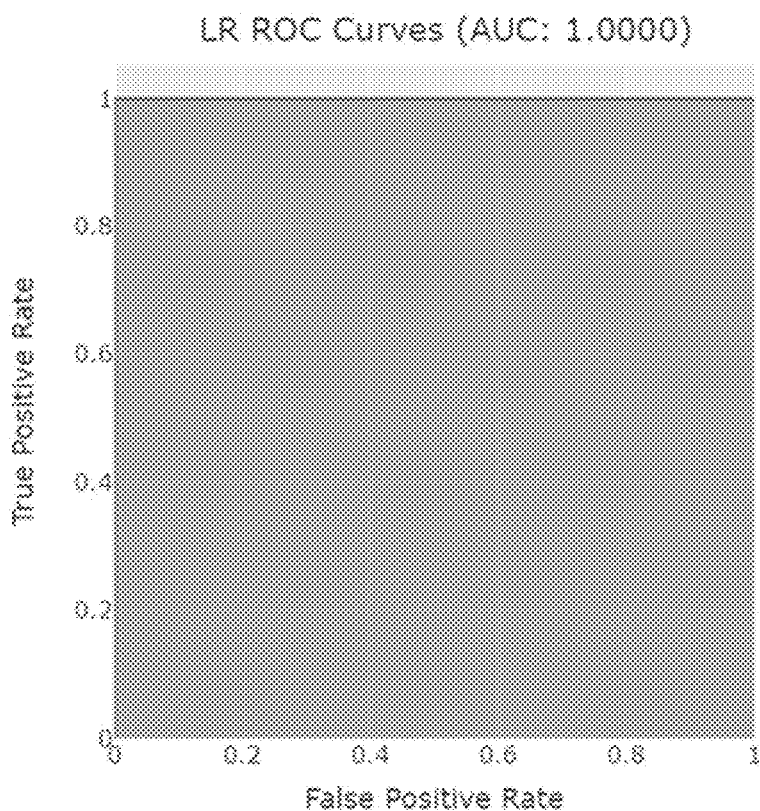
Figure 5C:
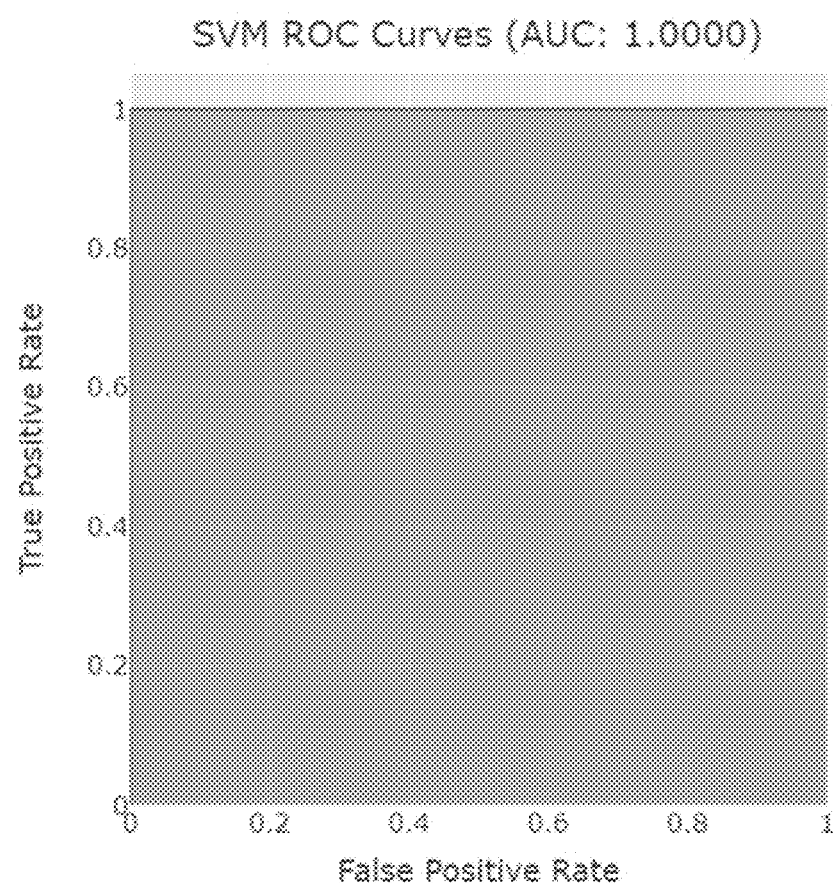

After the ROC curve was formed, the discriminative ability of the models was quantified by computing the area under the ROC curve using the trapezoidal rule to obtain the AUC results. The ROC curves and the AUC results of the hold-out set were visualized to compare the model performance. The plots are shown in FIGS. 5A-5C.

Figure 6A:
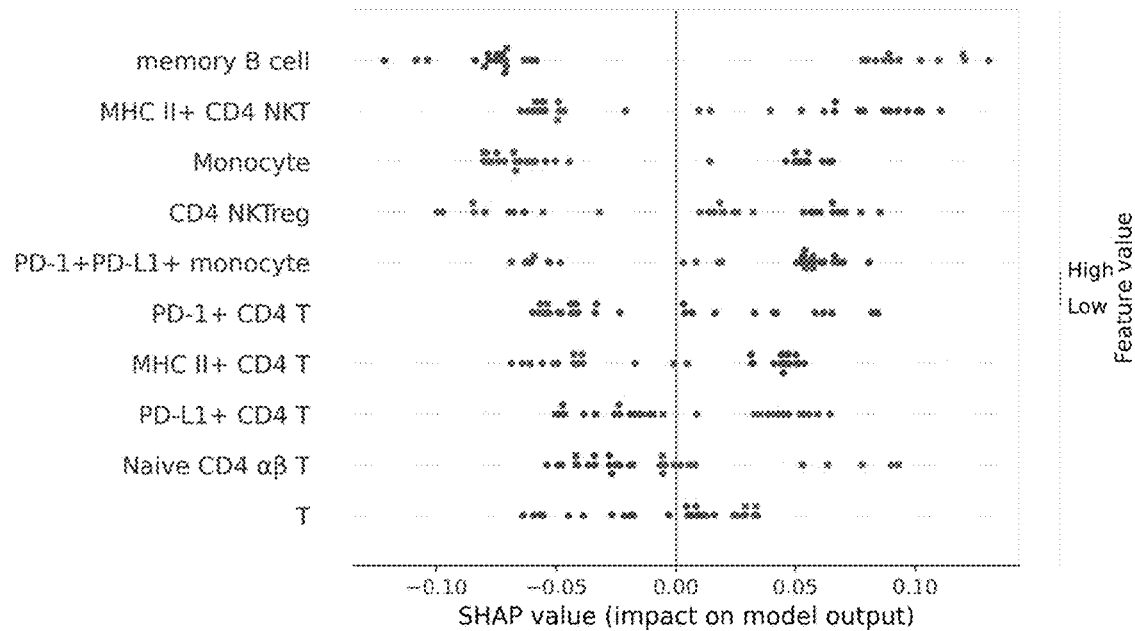
FIGS. 6A-6C illustrate the SHAP results of the hold-out set acquired from the machine learning method using the RF algorithm, the LR algorithm, and the SVM algorithm, respectively.
Figure 6B:
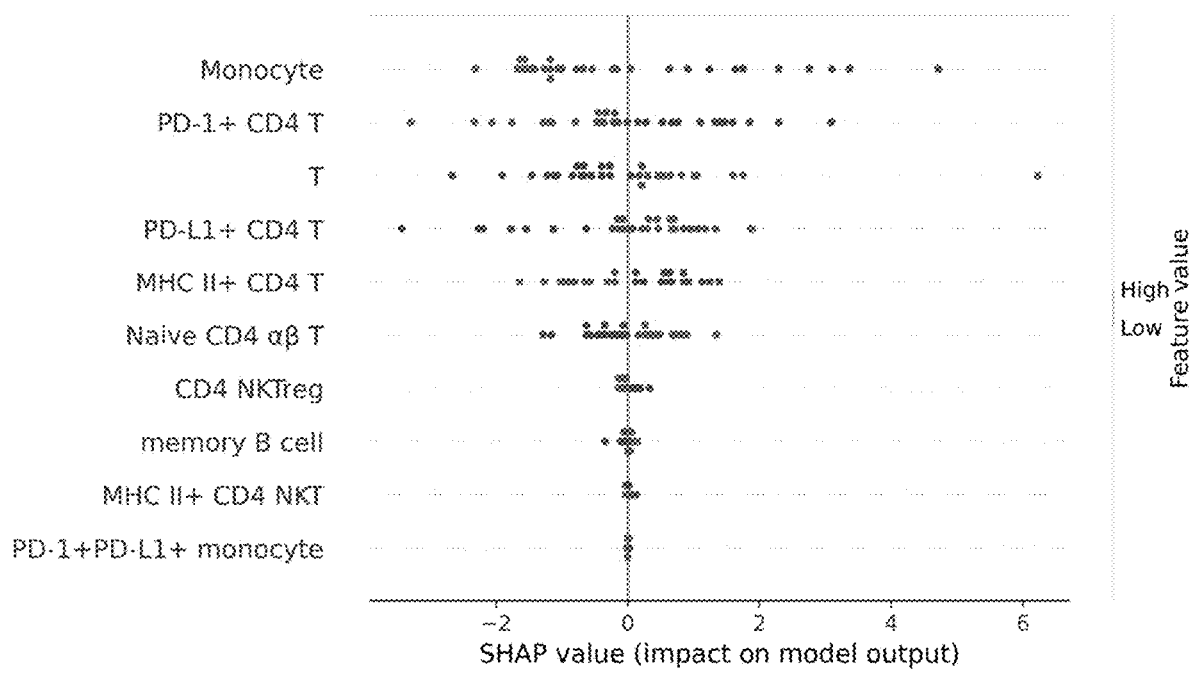
Figure 6C:
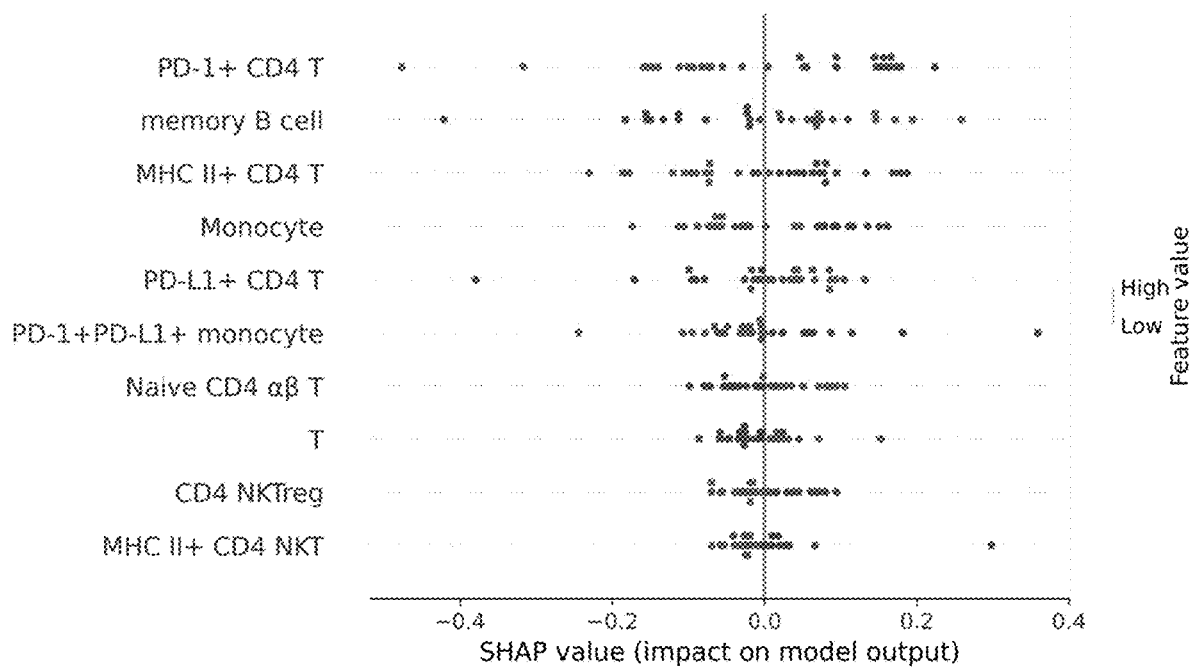

The SHAP method was applied to explain the model by computing the contribution of each selected feature to prediction. The SHAP summary plot was depicted to visualize the ranking of feature importance and the value of the feature per subject with the SHAP values. The color of the data point (subject) in each feature represents a high or a low feature value, in which each data point represents one subject. Red indicates high feature value, and blue indicates low feature value. The y-axis of the plot is the feature importance ranking of the selected features, and the x-axis is the SHAP value range. According to the trained model, the higher the SHAP value, the higher the risk of NPC. The summary plots of the hold-out set were shown in FIGS. 6A-6C.

In summary, the present invention not only can use to diagnosis a disease, such as NPC, but also can provide the prediction about immunotherapy based on states of PD-L1, PD-1 and T cells in the 10 immune cell subsets selected by said machine learning. For example, a subject can be administrated with Atezolizumab for treatment while an amount of PD-L1 expression of immune cells increases; can be administrated with Nivolumab or Pembrolizumab for treatment while an amount of PD-1 expression of immune cells increases; or can be supplemented with immune cells such as NK, DC, Cytokine-induced Killer (CIK), and T cells for treatment while T cells decreases.

Unless defined otherwise, all technical and scientific terms and any acronyms used herein have the same meanings as commonly understood by one of ordinary skill in the art in the field of this invention. Although any compositions, methods, kits, and means for communicating information similar or equivalent to those described herein can be used to practice this invention, the preferred compositions, methods, kits, and means for communicating information are described herein.

All references cited herein are incorporated herein by reference to the full extent allowed by law. The discussion of those references is intended merely to summarize the assertions made by their authors. No admission is made that any reference (or a portion of any reference) is relevant prior art. Applicants reserve the right to challenge the accuracy and pertinence of any cited reference.

REFERENCES

1. Chuang, W Y, Chang, S H, Yu, W H, Yang, C K, Yeh, C J, Ueng, S H, et al., Successful Identification of Nasopharyngeal Carcinoma in Nasopharyngeal Biopsies Using Deep Learning. *Cancers (Basel)* 2020; 12:507.
2. Gong, L, Kwong, DL, Dai, W, Wu, P, Li, S, Yan, Q, et al., Comprehensive single-cell sequencing reveals the stromal dynamics and tumor-specific characteristics in the microenvironment of nasopharyngeal carcinoma. *Nat Commun* 2021; 12:1540.

What is claimed is:

1. A staining kit, comprising a first pattern comprising antibodies against T cell, B cell, NK cell, monocyte, regulatory cell, CD8, CD45, and CTLA4; a second pattern comprising antibodies against T cell, B cell, NK cell, monocyte, regulatory cell, dendritic cell, and CD45; a third pattern comprising antibodies against T cell, B cell, NK cell, monocyte, CD8, CD45, CD45RA, CD62L, CD197, CX3CR1 and TCR$_{\alpha\beta}$; and a fourth pattern comprising antibodies against B cell, CD23, CD38, CD40, CD45 and IgM, wherein the antibodies of each pattern are labeled with fluorescent dyes.

2. The staining kit of claim 1, wherein the T cell comprises CD3, CD4, CD25, CD45RO, CCR7 or any combination thereof; the B cell comprises CD10, CD19, CD21, CD127, IgG or any combination thereof; the NK cell comprises CD56; the monocyte comprises CD14; the regulatory cell comprises PD-1, PD-L1, FoxP3 or any combination thereof; and the dendritic cell comprises CD11c, HLA-DR or combination thereof.

3. A method of identifying characterized immune cell subsets of a disease, comprising steps of:
(a) obtaining peripheral blood mononuclear cells (PBMCs) and/or white blood cells (WBCs) from a plurality of healthy controls and a plurality of patients having the disease, respectively;
(b) staining the PBMCs and/or the WBCs of the healthy controls and the patients, respectively, by using the staining kit of claim 1,
(c) performing data acquisition of fluorescent intensity of each antibody bound to the PBMCs and/or the WBCs of the healthy controls and the patients, respectively, by using flow cytometry;
(d) identifying immune cell subsets in the PBMCs and/or the WBCs of the healthy controls and the patients, respectively, by using a pedigree method to obtain a dataset comprising data related to types of the immune cell subsets and proportions thereof; and
(e) evaluating the dataset by using a machine learning software to obtain immune cell subsets of the patients distinguishable from those of the healthy controls as the characterized immune cell subsets of the disease,
wherein the step (e) further comprises the following steps performed by the machine learning software:
(i) performing data preprocessing of the dataset;
(ii) performing a feature selection from the preprocessed data by using a Boruta algorithm to obtain predetermined immune cell subsets of the disease as selected features; and
(iii) applying data of the selected features to train machine learning models by at least one of a random forest (RF) algorithm, a logistic regression (LR) algorithm and a support vector machines (SVM) algorithm.

4. The method of claim 3, wherein the disease comprises a cancer, an immunological disease and an infectious disease.

5. The method of claim 4, wherein the cancer comprises nasopharyngeal carcinoma (NPC).

6. The method of claim 5, wherein the characterized immune cell subsets of NPC is selected from the group consisting of memory B cells, monocytes, T cells, naïve CD4 $\alpha\beta$ T cells, PD-1$^+$CD4 T cells, PD-L1$^+$ CD4 T cells, PD-1$^+$PD-L1$^+$ monocytes, CD4 NKTreg cells, MHC II$^+$ CD4 T cells and MHC II$^+$ CD4 NKT cells.

7. A method of predicting the likelihood of nasopharyngeal carcinoma (NPC) in a subject in need thereof, comprising steps of:
(a) staining peripheral blood mononuclear cells (PBMCs) from the subject by using the staining kit of claim 1;
(b) performing data acquisition of fluorescent intensity of each antibody bound to characterized immune cell subsets of NPC by using flow cytometry to obtain a dataset comprising data related to types of the characterized immune cell subsets and proportions thereof; and
(c) evaluating the dataset by using a machine learning software to predict whether the subject has nasopharyngeal carcinoma,
wherein the characterized immune cell subsets of NPC are selected from the group consisting of memory B cells, monocytes, T cells, naïve CD4 $\alpha\beta$ T cells, PD-1$^+$CD4 T cells, PD-L1$^+$ CD4 T cells, PD-1$^+$PD-L1$^+$ monocytes, CD4 NKTreg cells, MHC II$^+$ CD4 T cells, and MHC II$^+$ CD4 NKT cells,
wherein the step (c) further comprises the following steps performed by the machine learning software:
(i) applying the hold-out set with the characterized immune cell subsets to test trained machine learning models; and
(ii) predicting the subject as nasopharyngeal carcinoma if a value of the predicted probability obtained from a RF algorithm or a LR algorithm is larger than a first threshold value, or a value of a decision function obtained from a SVM algorithm is larger than a second threshold value, wherein the first threshold value is 0.5, and the second threshold value is 0.

\* \* \* \* \*